(12) United States Patent
Seo et al.

(10) Patent No.: US 7,639,933 B2
(45) Date of Patent: Dec. 29, 2009

(54) STAGE APPARATUS AND IMAGE MOVEMENT CORRECTION APPARATUS FOR CAMERA USING STAGE APPARATUS

(75) Inventors: Shuzo Seo, Saitama (JP); Shigeo Enomoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 562 days.

(21) Appl. No.: 11/423,593

(22) Filed: Jun. 12, 2006

(65) Prior Publication Data

US 2006/0284495 A1 Dec. 21, 2006

(30) Foreign Application Priority Data

Jun. 15, 2005 (JP) ............................ 2005-174947
Aug. 22, 2005 (JP) ............................ 2005-240045

(51) Int. Cl.
G03B 17/00 (2006.01)
G03B 3/10 (2006.01)
G03B 13/34 (2006.01)
H04N 5/228 (2006.01)
G02B 27/64 (2006.01)

(52) U.S. Cl. ................... 396/55; 396/75; 396/133; 348/208.4; 348/208.99; 359/554

(58) Field of Classification Search ............ 396/52–55, 396/72, 75, 89, 133, 542, 557; 348/208.4, 348/208.7, 208.8, 208.99, 208.11, 340, 375; 359/554, 557, 811, 813, 368; 250/201.2
See application file for complete search history.

(56) References Cited

U.S. PATENT DOCUMENTS 5,266,988 A 11/1993 Washisu .................... 396/55
5,534,967 A * 7/1996 Matsuzawa ................ 396/55
6,035,131 A 3/2000 Washisu .................... 396/55

2005/0157287 A1 7/2005 Seo .......................... 355/72

(Continued)

FOREIGN PATENT DOCUMENTS

JP 63-99680 4/1988

(Continued)

OTHER PUBLICATIONS

English Language Abstract of JP 2641172.

(Continued)

*Primary Examiner*—Melissa J Koval
(74) *Attorney, Agent, or Firm*—Greenblum & Bernstein, P.L.C.

(57) ABSTRACT

A stage apparatus includes a stationary support plate; a stage member provided on the stationary support plate so as to move on a reference plane parallel with the stationary support plate; Y-direction magnetic flux generating devices secured to one of the stationary support plate and the stage member; and Y-direction moving coils secured to the other of the stationary support plate and the stage member, the Y-direction moving coils receiving magnetic flux from the Y-direction magnetic flux generating devices so as to generate a driving force in a specific Y-direction between the Y-direction magnetic flux generating devices and the Y-direction moving coils. The Y-direction moving coils are secured to the stage member so that the Y-direction moving coils at least partly overlap each other in an X-direction, which is parallel with the reference plane and perpendicular to the Y-direction, and do not overlap in the Y-direction.

14 Claims, 15 Drawing Sheets

U.S. PATENT DOCUMENTS

| | | | |
|---|---|---|---|
| 2005/0185057 A1 | 8/2005 | Seo | 348/208.4 |
| 2005/0244152 A1 | 11/2005 | Seo | 396/55 |
| 2005/0270379 A1 | 12/2005 | Seo | 348/208.5 |
| 2005/0276589 A1 | 12/2005 | Seo | 396/55 |
| 2006/0007320 A1 | 1/2006 | Seo | 348/219.1 |
| 2006/0017818 A1 | 1/2006 | Enomoto | 348/219.1 |
| 2006/0064884 A1 | 3/2006 | Seo | 33/1 |
| 2006/0067660 A1 | 3/2006 | Seo | 396/55 |
| 2006/0070302 A1 | 4/2006 | Seo | 52/6 |
| 2006/0146400 A1 | 7/2006 | Seo | 348/219.1 |
| 2006/0284495 A1 | 12/2006 | Seo et al. | 310/12 |
| 2007/0236577 A1* | 10/2007 | Ke et al. | 348/208.99 |
| 2007/0269195 A1 | 11/2007 | Uenaka | 395/55 |
| 2008/0012947 A1 | 1/2008 | Uenaka | 348/208.1 |
| 2008/0013937 A1 | 1/2008 | Uenaka | 396/55 |
| 2008/0013938 A1 | 1/2008 | Uenaka | 396/55 |
| 2008/0013939 A1 | 1/2008 | Ogawa | 396/55 |
| 2008/0226276 A1 | 9/2008 | Uenaka | 396/55 |
| 2008/0226277 A1 | 9/2008 | Uenaka et al. | 396/55 |
| 2008/0298790 A1 | 12/2008 | Uenaka et al. | 396/55 |

FOREIGN PATENT DOCUMENTS

| | | |
|---|---|---|
| JP | 8-152661 | 6/1996 |
| JP | 8-304868 | 11/1996 |
| JP | 2641172 | 5/1997 |
| JP | 2005-184122 | 7/2005 |
| JP | 2005-351917 | 12/2005 |
| JP | 2005-352113 | 12/2005 |
| JP | 2006-71743 | 3/2006 |

OTHER PUBLICATIONS

English Language Abstract of JP 8-152661.
English Language Abstract of JP 2005-351917.
English Language Abstract of JP 2005-352113.
English language Abstract of JP 63-99680, Apr. 30, 1988.
English language Abstract of JP 2006-71743, Mar. 16, 2006.
English Language Abstract of JP 2641172, May 2, 1997.
English Language Abstract of JP 8-152661, Jun. 11, 1996.
English Language Abstract of JP 2005-351917, Dec. 22, 2005.
English Language Abstract of JP 2005-352113, Dec. 22, 2005.

* cited by examiner ular shake about the optical axis occurs, based on shake information from the shake detector and rotational shake information from the rotation detector.

STAGE APPARATUS AND IMAGE MOVEMENT CORRECTION APPARATUS FOR CAMERA USING STAGE APPARATUS

BACKGROUND OF THE INVENTION

1. Field of the Invention

The present invention relates to a stage apparatus which is movable on a specific plane and an image movement correction apparatus for a camera using the stage apparatus.

2. Description of the Related Art

In a known image movement correction apparatus for a camera, a movable portion, such as a circuit board, which supports a correction lens or an image pickup device, is supported to linearly move relative to a stationary support plate in orthogonal X and Y directions perpendicular to an optical axis (Japanese Patent No. 2,641,172). It is also known that the direction in which the movable portion is moved is corrected if the movable portion and the stationary support plate rotate about the optical axis during the focusing operation (Japanese Unexamined Patent Publication No. 8-152661).

However, in image movement correction apparatuses of the prior art, since the movable portion is moved linearly only in the X and Y directions, it is impossible to correct an image movement due to a camera shake which includes a rotational movement of the camera. However, if a mechanism for correcting the rotational movement of the camera is additionally provided, the image movement correction apparatus is made large and heavy.

SUMMARY OF THE INVENTION

In view of the drawbacks of the prior art, it is an object of the present invention to provide a small stage apparatus in which a camera shake in the movement direction of an optical axis of a photographing lens of a camera as well as a camera shake abut an axis parallel with the optical axis of the photographing lens can be corrected. Another object of the present invention is to provide an image movement correction apparatus using the stage apparatus.

According to an aspect of the present invention, a stage apparatus is provided, including a stationary support plate; a stage member provided on the stationary support plate so as to move on a reference plane parallel with the stationary support plate; a plurality of Y-direction magnetic flux generating devices secured to one of the stationary support plate and the stage member; and a plurality of Y-direction moving coils secured to the other of the stationary support plate and the stage member, the Y-direction moving coils receiving magnetic flux from the Y-direction magnetic flux generating devices so as to generate a driving force in a specific Y-direction parallel with the reference plane between the Y-direction magnetic flux generating devices and the Y-direction moving coils. One of the Y-direction moving coils and the Y-direction magnetic flux generating devices at least partly overlap each other in an X-direction, which is parallel with the reference plane and perpendicular to the Y-direction, and do not overlap in the Y-direction.

It is desirable for one of the Y-direction moving coils and the Y-direction magnetic flux generating devices which are secured to the stage member to be aligned in the X-direction.

It is desirable for the stage apparatus to include a pair of Y-direction displacement detection sensors provided in the vicinity of opposite ends of the one of the Y-direction moving coils and the Y-direction magnetic flux generating devices which are secured to the stage member, for detecting displacement thereof in the Y-direction.

It is desirable for all of the Y-direction moving coils that are secured to the stage member to be arranged between the pair of Y-direction displacement detection sensors.

It is desirable for the stage apparatus to include an X-direction magnetic flux generating device secured to one of the stationary support plate and the stage member, and an X-direction moving coil secured to the other of the stationary support plate and the stage member, the X-direction moving coil receiving magnetic flux from the X-direction magnetic flux generating device so as to generate a driving force in the X-direction between the X-direction magnetic flux generating device and the X-direction moving coil.

It is desirable for the stage apparatus to include an image movement correction apparatus.

It is desirable for the image movement correction apparatus to include an image pickup device having a square shape defined by a pair of X-direction sides extending in the X-direction and a pair of Y-direction sides extending in the Y-direction. One of the Y-direction magnetic flux generating devices and the Y-direction moving coils which are secured to the stage member are secured thereto along the X-direction sides. One of the X-direction magnetic flux generating device and the X-direction moving coil which is secured to the stage member is secured thereto along the Y-direction sides.

It is desirable for the image movement correction apparatus to include a correction lens.

It is desirable for the X-direction moving coil and the Y-direction moving coils to each include a planar coil parallel with the reference plane.

It is desirable for the X-direction magnetic flux generating device and the Y-direction magnetic flux generating devices to each includes a magnet and a yoke through which magnetic flux of the magnet is transmitted and which generates magnetic lines of flux together with the magnet.

In an embodiment, an image movement correction apparatus for a camera using the stage apparatus is provided, the camera including the stage apparatus; a rotational shake detection sensor for detecting rotational shake of the camera in the reference plane; and a controller for supplying electricity to the Y-direction moving coils to correct the camera shake in accordance with shake information detected by the rotation-shake detection sensor.

It is desirable for the image movement correction apparatus to include X-direction and Y-direction shake detection sensors for detecting camera shake in the X-direction and the Y-direction, respectively, wherein the controller supplies electricity to the X-direction moving coil and the Y-direction moving coils to correct the camera shake in accordance with shake information detected by the X-direction shake detection sensor and the Y-direction shake detection sensor, respectively.

In an embodiment, an image movement correcting apparatus is provided, including a support device for supporting an image pickup device so as to move in a direction perpendicular to an optical axis of a photographing optical system and to rotate about an axis parallel with the optical axis; a drive device for moving the image pickup device in a direction perpendicular to the optical axis and for rotating the image pickup device about the axis parallel with the optical axis; a shake detector for detecting the shake of the photographing optical system about the optical axis; a rotation detector for detecting a rotational shake of the photographing optical system about the optical axis; and a controller for driving the drive device to move the image pickup device, so that no movement of an object image formed on an image pickup surface of the image pickup device by the photographing optical system occurs if the optical axis moves or if rotational shake about the optical axis occurs, in accordance with a detection result of the shake detector and the rotation detector.

It is desirable for the drive device to rotate the image pickup device about an axis parallel with the optical axis of the photographing optical system.

It is desirable for the support device to include a stationary support plate perpendicular to the optical axis; and a stage member which is supported so as to move and rotate on a reference plane parallel with the stationary support plate, relative to the stationary support plate, the stage member holding the image pickup device. The drive device includes a plurality of drive magnetic flux generating devices, secured to the stationary support plate at positions distant from the optical axis, for generating a magnetic flux in a direction parallel with the optical axis; and a plurality of sets of drive coils secured to the stage member, for generating a drive force in a specific direction parallel with the reference plane, upon receiving magnetic flux of the drive magnetic flux generating devices. At least one set of drive coils includes two drive coils spaced from one another in a direction perpendicular to the specific direction. A specific direction displacement detection sensor is provided for each of the two drive coils. The controller supplies electricity to the two drive coils to thereby move the stage member while detecting the displacement thereof by the specific direction displacement sensors, and independently supplies electricity to the two drive coils to thereby rotate the stage member while detecting the displacement thereof by the specific direction displacement sensor.

It is desirable for the shake detector to include a Y-direction shake detection sensor for detecting shake in a longitudinal direction perpendicular to the optical axis, an X-direction shake detection sensor for detecting the shake in a lateral direction perpendicular to the optical axis, and the rotation detector to include a rotational shake detection sensor for detecting rotational shake about the optical axis of the photographing optical system. The two drive coils are controlled by the controller so that output of the specific direction displacement sensor of the two drive coils complies with a signal obtained by adding/subtracting a rotational shake signal based on the output of the rotational shake detection sensor to/from a Y-direction shake signal based on the output of the Y-direction shake detection sensor.

It is desirable for the Y-direction shake detection sensor to be a Y-direction gyro sensor, the X-direction shake detection sensor to be an X-direction gyro sensor, and the rotational shake detection sensor to be a rotation detection gyro sensor.

It is desirable for the drive magnetic flux generating device to be elongated in a direction perpendicular to a direction of a drive force acting on a corresponding the drive coil, and wherein the corresponding drive coils to be planar coils elongated in the perpendicular direction.

It is desirable for the image pickup device to include a rectangular image pickup area, wherein each of the set of drive coils are arranged symmetrically with respect to a straight line which passes through a center thereof and is parallel with minor sides of the rectangular image pickup area.

It is desirable for the two drive coils to be arranged in series along a major side of the rectangular mage pickup area and are arranged symmetrically with respect to the straight line.

It is desirable for another set of the drive coils to include two drive coils which are arranged along the opposite minor sides of the rectangular image pickup area so as to be arranged symmetrically with respect to the straight line.

The present disclosure relates to subject matter contained in Japanese Patent Application Nos. 2005-174947 (filed on Jun. 15, 2005) and No. 2005-240045 (filed on Aug. 22, 2005) which are expressly incorporated herein by reference in their entireties.

DESCRIPTION OF THE PREFERRED EMBODIMENT

A first embodiment of the present invention will be discussed below with reference to FIGS. 1 through 10.

Figure 1:
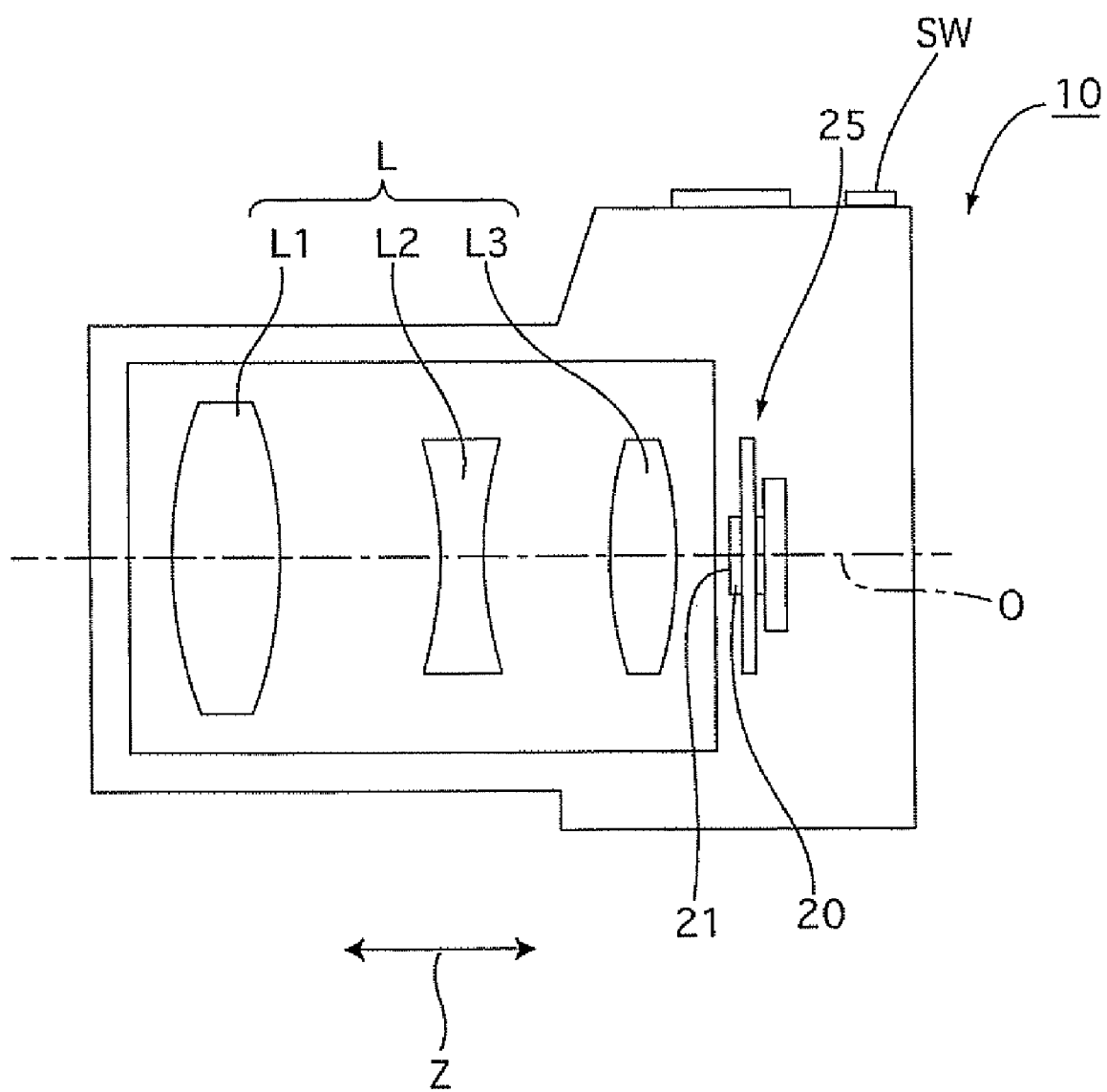
FIG. 1 is a longitudinal sectional view of a digital camera having an image movement correcting apparatus incorporated therein, according to a first embodiment of the present invention.

As shown in FIG. 1, the digital camera 10 has a photographing lens (photographing optical system) L including a plurality of lenses L1, L2, and L3. A CCD 20, which constitutes an image pickup device, is provided behind the lens L3. An image pickup surface 21 of the CCD 20 perpendicular to the optical axis O of the photographing lens L is located at an image forming position (focal position) of the photographing lens L on design. The CCD 20 is secured to an image movement correction apparatus 25 incorporated in the digital camera 10.

The image movement correction apparatus 25 is constructed as shown in FIGS. 2 through 8.

Figure 3:
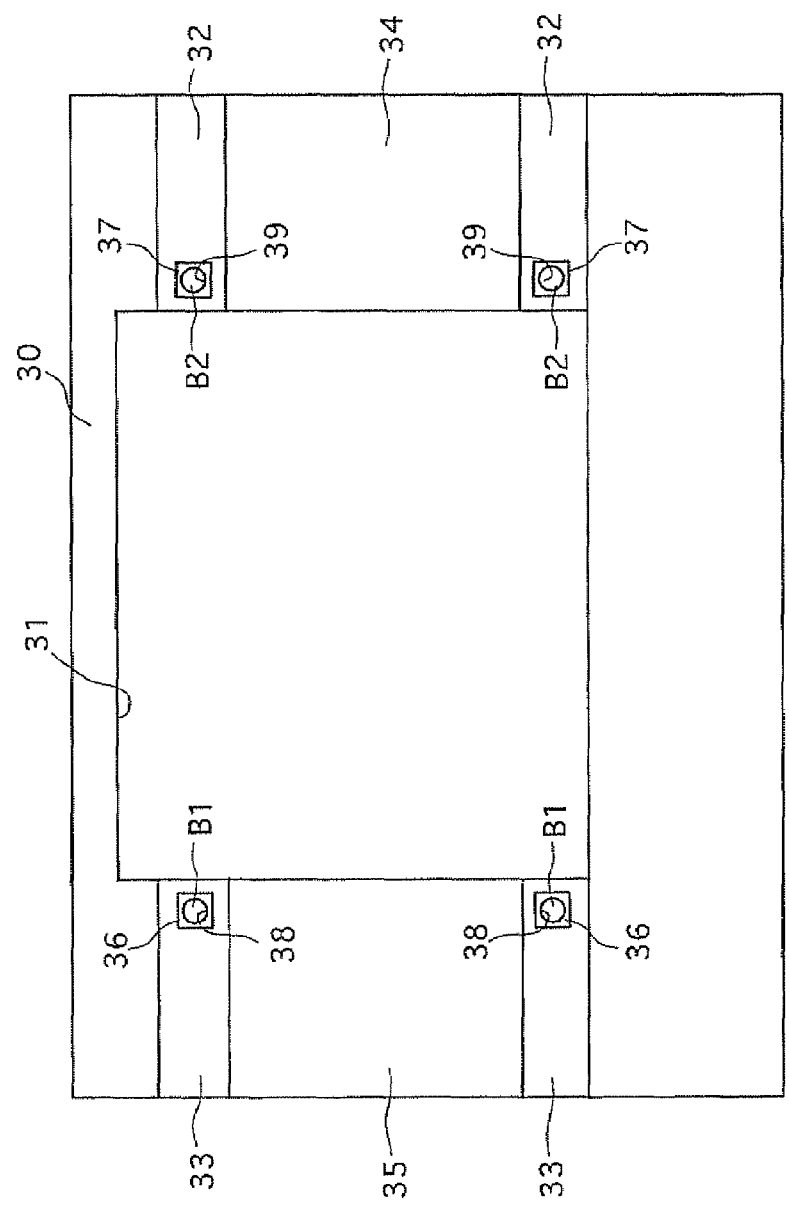
FIG. 3 is a back view of a stationary support plate.

As can be seen in FIG. 3, a stationary support plate (support device) 30, which is square in shape as viewed from rear thereof and is provided at its center portion with a square receiving aperture 31, is secured to an inner surface of a camera body 12 (see FIG. 5) of a digital camera 10 by a securing device (not shown). The stationary support plate 30 is perpendicular to the optical axis O and the center of the receiving aperture 31 is substantially located on the optical axis O. The stationary support plate 30 is provided, on the rear surface thereof, with a pair of rearwardly extending upper and lower projections 32 and a pair of rearwardly extending upper and lower projections 33 on the right and left sides of the receiving aperture 31, respectively. A mounting recess 34 and a mounting recess 35 are formed between the upper and lower projections 32 and between the upper and lower projections 33, respectively.

Figure 2:
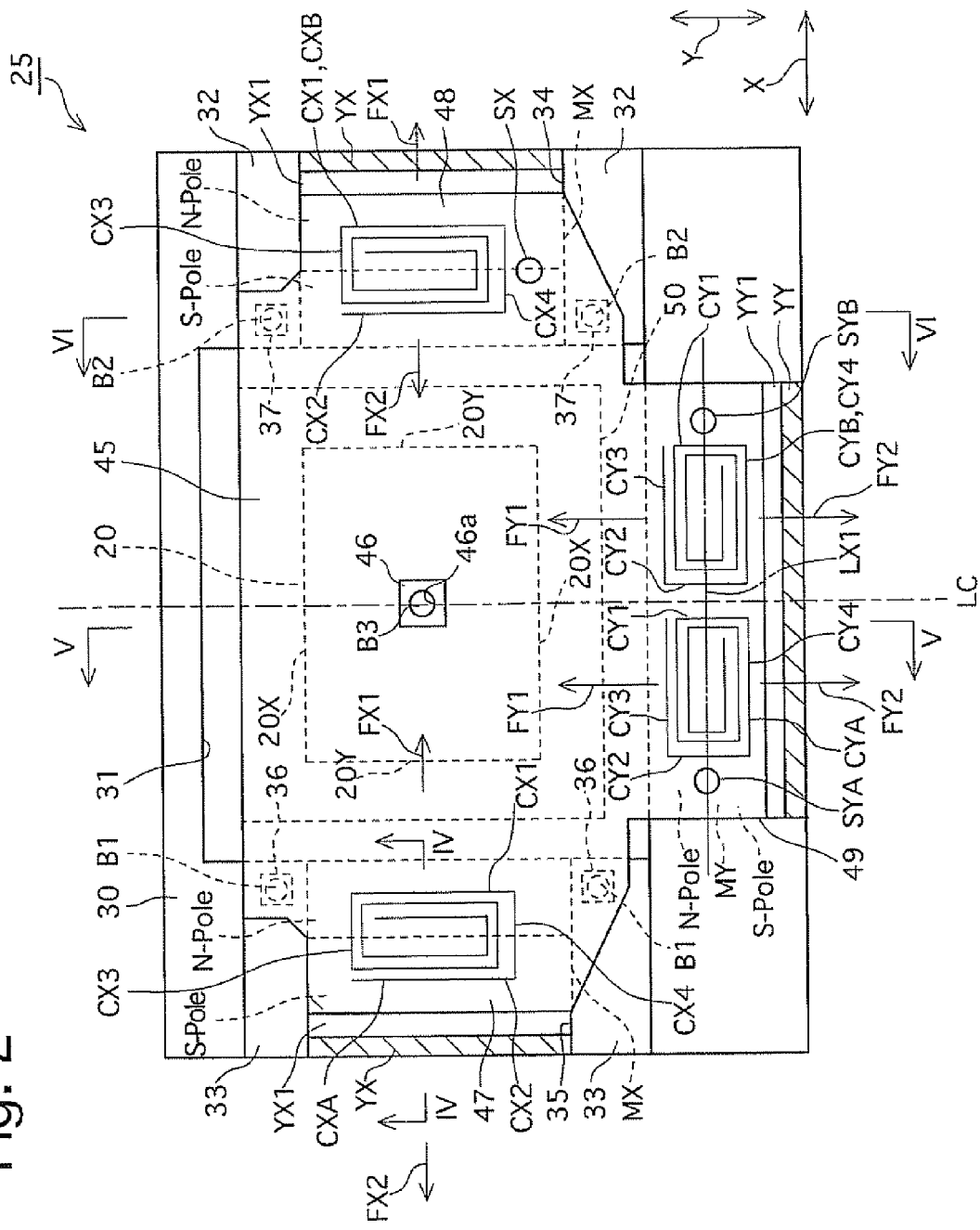
FIG. 2 is a back view of an image movement correcting apparatus in an inoperative position, in which yokes are partially sectioned.
Figure 4:
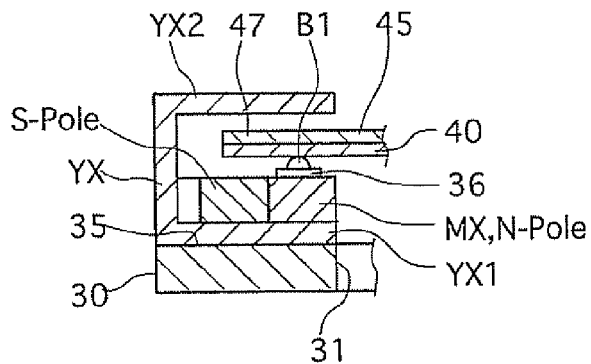
FIG. 4 is a sectional view taken along the line IV-IV in FIG. 2.

As shown in FIGS. 2 and 4, front plate portions YX1 of metal yokes YX having a U-shaped cross section are secured to the mounting recesses 34 and 35. Permanent magnets (X-direction magnet flux generating devices) MX whose N-pole and S-pole are juxtaposed in the X-direction (right and left direction in FIG. 2) are secured to the rear surfaces of the front plate portions YX1 of the yokes YX. As shown in FIG. 4, the rear plate portions YX2 of the yokes YX are opposed to the permanent magnets MX, so that a high magnetic flux density space is defined therebetween.

Figure 5:
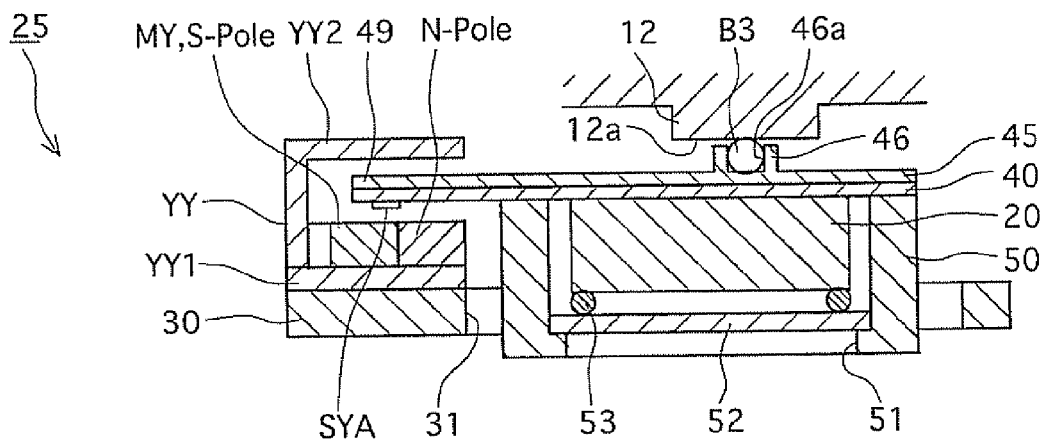
FIG. 5 is a sectional view taken along the line V-V in FIG. 2.
Figure 6:
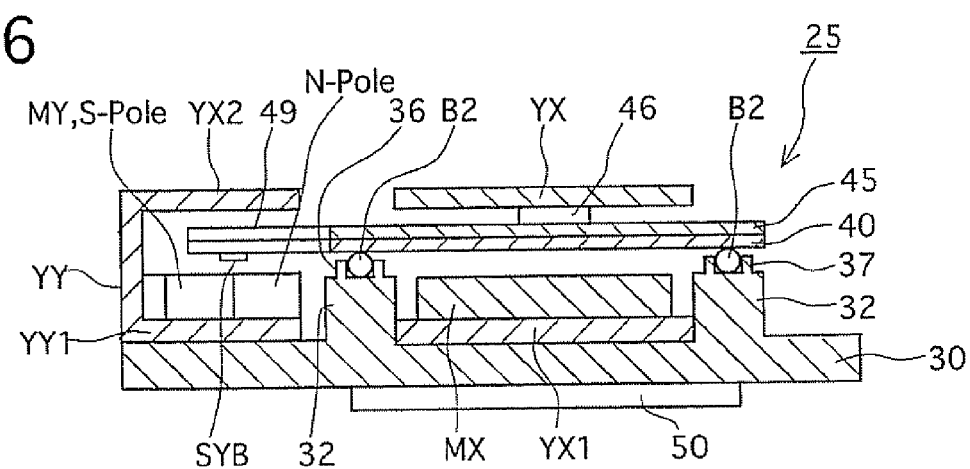
FIG. 6 is a sectional view taken along the line VI-VI in FIG. 2.

Front plate portions YY1 of metal yokes YY having a U-shaped cross section are secured to the lower portions of the rear surfaces of the stationary support plate 30. Permanent magnets (Y-direction magnetic flux generating devices) MY whose N-pole and S-pole are juxtaposed in the Y-direction (upward and downward direction in FIG. 2) are secured to the rear surfaces of the front plate portions YY1 of the yokes YY. As shown in FIGS. 5 and 6, the rear plate portions YY2 of the yokes YY are opposed to the permanent magnets MY, so that a high magnetic flux density space is defined therebetween.

The projections 32 and 33 of the stationary support plate 30 are provided on the rear surfaces with support projections 36 and 37 which are identical in shape. The support projections 36 and 37 are provided on the rear surfaces with semi-spherical support recesses 38 and 39, respectively (see FIG. 3). Balls B1 and B2 are rotatably fitted in the support recesses 38 and 39, so that substantially half of each of the balls is exposed.

The balls B1 and B2 are always in contact, at the exposed portions thereof projecting from the respective support recesses 38 and 39, with a front surface (on the object side) of a reinforcement plate (stage member) 40, which is parallel with the stationary support plate 30 (i.e., parallel with a reference plane perpendicular to the optical axis O). Each of the balls B1 and B2 rolls in accordance with the movement of the front surface of the reinforcement plate 40, when a force acts on the reinforcement plate 40 in a direction perpendicular to the optical axis O. Namely, the reinforcement plate 40 is supported by the balls B1 and B2 so as to rotate and linearly move in a plane perpendicular to the optical axis O. A ball B3 is rotatably fitted in the support recess 46*a* with substantially half thereof exposed. As can be seen in FIG. 5, the ball B3 is always in contact, at the exposed portion thereof projecting from the support recess 46*a*, with a contact surface (inner surface) 12*a* parallel with the reference plane of the camera body 12. When a force acts on a circuit board 45 in a direction parallel with the contact surface 12*a*, the ball B3 rolls on the contact surface 12*a* in accordance with the movement of the circuit board 45. Thus, the circuit board 45 is supported by the ball B3 so as to rotate and move in a plane perpendicular to the optical axis O.

As mentioned above, the reinforcement plate 40 and the circuit board 45 are held between the balls B1, B2 and B3 from the forward and rearward directions. The balls B1 and B2 support the reinforcement plate 40 so as to translate, and the ball B3 supports the circuit board 45 so as to translate. Consequently, the reinforcement plate 40 and the circuit board 45 are movable and rotatable with respect to the stationary support plate 30 along a reference plane perpendicular to the optical axis O. Specifically, the reinforcement plate 40 and the circuit board 45 are supported so as not only to linearly move in an optional direction but also to rotate, within the reference plane, from the initial positions shown in FIG. 2. The balls B1, B2 and B3 can be made of metal and are desirably made of a low-frictional material having resiliency, for example, acetal resin.

The CCD 20, which is rectangular as viewed from the front thereof as shown in FIG. 2, is secured to the central portion of the front surface of the reinforcement plate 40. The CCD 20 is provided with a pair of upper and lower X-direction sides 20X parallel with the X-direction and a pair of right and left Y-direction sides 20Y parallel wt the Y-direction. The CCD 20 has an effective image pickup area which is assumed to be rectangular in shape as defined by the X-direction sides 20X and the Y-direction sides 20Y in the illustrated embodiment. When the circuit board 45 is in the initial position shown in FIG. 2, the optical axis O passes through the center of the effective image pickup area of the CCD 20.

A CCD holder (stage member) 50 which is in the form of a hollow box is secured at its rear surface to the front surface of the reinforcement plate 40 to surround the CCD 20 (see FIG. 5). The CCD holder 50 is smaller than the receiving aperture 31 as viewed from the rear thereof. The front end of the CCD holder 50 is located in the receiving aperture 31 of the stationary support plate 30 so as to relatively move therein. The CCD holder 50 is provided in its front surface with an opening 51 which has a square shape as viewed from the front thereof. The CCD holder 50 is provided therein with a low-pass filter 52 and the CCD 20 between which a square-shaped annular retainer 53 is held. The image pickup surface 21 of the CCD 20 faces the opening 51 in the forward direction.

Figure 7:
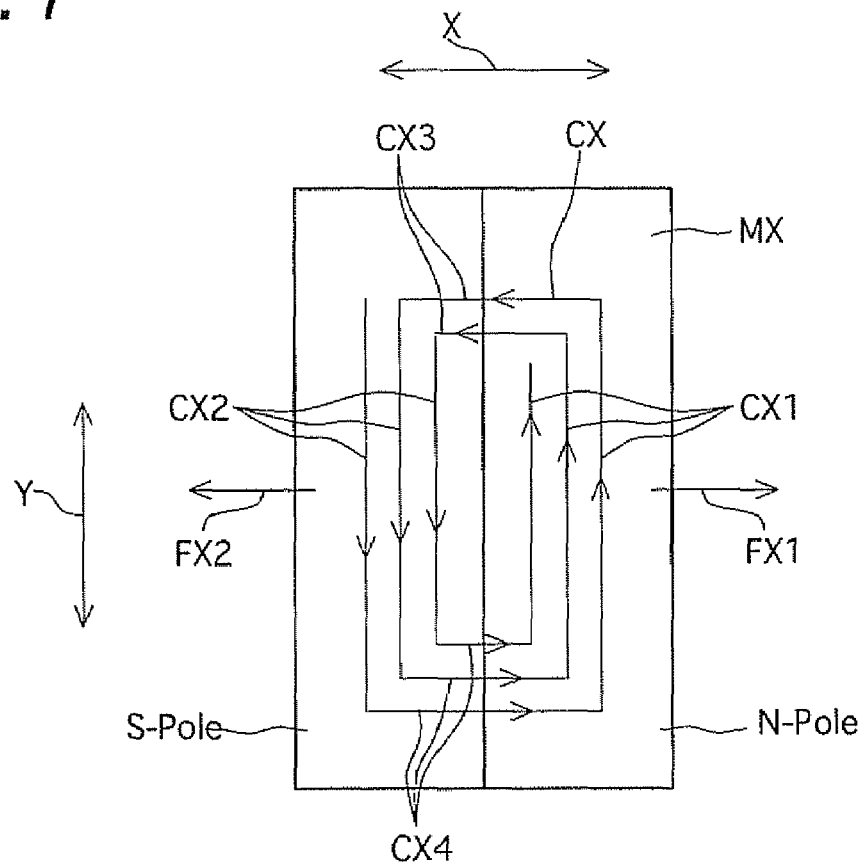
FIG. 7 is an enlarged schematic view of a main part of an X-direction drive device.

The circuit board 45 is provided with right and left tongues 47 and 48, and a lower tongue 49. As can be seen in FIGS. 2 and 4, the tongues 47 and 48 are located between the front plate portions YX1 and the rear plate portions YX2 of the yokes YX. The tongues 47 and 48 are provided thereon with a (set) pair of identical X-direction drive coils CXA and CXB in the form of printed circuit boards. The right and left X-direction drive coils CXA and CXB are made of planar coils parallel with the reference plane and are arranged in a direction parallel with the X-direction sides 20X (in the X-direction in FIG. 2). In other words, the positions of the right and left X-direction drive coils CXA and CXB in a direction parallel with the Y-direction sides 20Y (Y-direction in FIG. 2) are identical. As shown in FIGS. 2 and 7, the X-direction drive coils CXA and CXB are spirally wound with each side extending Linearly and are defined by the right sides CX1, the left sides CX2, the upper sides CX3 and the lower sides CX4. The right sides CX1 and the left sides CX2 are parallel with the Y-direction sides 20Y and the upper sides CX3 and the lower sides CX4 are parallel with the X-direction sides 20X. In FIGS. 2 and 7, the X-direction drive coils CXA and CXB are provided with several turns for the sake of convenience, but the coils are, in practice, provided with several scores of turns. The X-direction drive coils CXA, CXB, the yokes YX and the permanent magnets MX form an X-direction drive device.

A movement extremity restriction device (not shown) is provided between the circuit board 45 and the stationary support plate 30 to restrict the extremities of the movement of the circuit board 45 relative to the stationary support plate 30 within a predetermined range. The right sides CX1 of the X-direction drive coils CXA and CXB and the N-poles of the permanent magnets MX always overlap in the Z-direction (indicated by the arrow Z in FIG. 1, i.e., the direction of the optical axis O) and the left sides CX2 and the S-poles of the permanent magnets MX always overlap in the Z-direction.

A Hall sensor SX is provided in the vicinity of the right X-direction drive coil CXB and is secured to the tongue 48 to detect the displacement of the X-direction drive coil CXB in the X-direction. The displacement of the left X-direction drive coil CXA in the X-direction is identical to that of the right X-direction drive coil CXB in the X-direction and accordingly can be also detected by the Hall sensor SX. The Hall sensor SX detects a change in the magnetic flux produced between the permanent magnets MX and the yokes YX to thereby detect the displacement of the X-direction drive coils CXA and CXB in the X-direction.

The operation of the stage apparatus when the X-direction drive coils CXA and CXB are supplied with electricity is as follows. For example, when the circuit board 45 is in the initial position shown in FIG. 2, if current in the direction FX1 is supplied to the X-direction drive coils CXA and CXB, forces in the direction FX1 are generated in the right sides CX1 and the left sides CX2, as shown in FIGS. 2 and 7. If current in the opposite direction is supplied to the X-direction drive coils CXA and CXB, the forces in the direction FX2 are generated in the right sides CX1 and the left sides CX2, as shown in FIGS. 2 and 7. The directions FX1 and FX2 are normal to the right sides CX1 and the left sides CX2 (parallel with the X-direction sides 20X) and the direction FX1 and FX2 constitute reference directions for the X-direction drive coils CXA and CXB. When the circuit board 45 is in the initial position shown in FIG. 2, the directions FX1 and FX2 are opposed to each other and are both in the X-direction. Consequently, if the X-direction drive coils CXA and CXB are supplied with electricity in the direction indicated by the arrows in FIG. 7 when the circuit board 45 is in the initial position, the reinforcement plate 40 and the circuit board 45 linearly move in the direction FX1 relative to the stationary support plate 30 due to the forces in the direction FX1. The forces are generated in the upper sides CX3 and the lower sides CX4, however, these forces are cancelled out, and hence, theses forces are not exerted on the reinforcement plate 40 and the circuit board 45. If the current in the opposite direction to the direction shown in FIG. 7 is supplied to the X-direction drive coils CXA and CXB, linear forces in the direction FX2 are generated in the right sides CX1 and the left sides CX2, so that the reinforcement plate 40 and the circuit board 45 are linearly moved in the direction FX2 relative to the stationary support plate 30.

Namely, it is possible to linearly move the reinforcement plate 40 and the circuit board 45 relative to the stationary support plate 30 in the direction FX1 or FX2 within the overlapping range in which the right sides CX1 overlap the N-pole in the Z-direction and the left sides CX2 overlap the S-pole in the Z-direction, by controlling the direction of the current to be supplied to the X-direction drive coils CXA and CXB.

If electricity supply to the X-direction drive coils CXA and CXB is stopped, no drive force in the direction FX1 or FX2 is generated, so that no movement of the reinforcement plate 40 and the circuit board 45 takes place.

Since the amount of current supplied to the X-direction drive coils CXA and CXB is substantially proportional to the forces generated thereby, the CCD 20 can be moved in the X-direction at a speed corresponding to the speed of the image movement due to the camera shake in the X-direction by controlling the current to be supplied to the X-direction drive coils CXA and CXB by the control circuit.

As can be seen in FIGS. 2, 5 and 6, the tongue 49 is located between the front plate portion YY1 and the rear plate portion YY2 of the yoke YY. The tongue 49 is provided with a pair of identical Y-direction drive coils CYA and CYB in the form of a printed circuit board. The Y-direction drive coils CYA and CYB are planar coils parallel with the reference plane and are juxtaposed along the lower side 20X (i.e., along the X-direction in FIG. 2). In other words, the positions of the Y-direction drive coils CYA and CYB in a direction parallel with the Y-direction sides 20Y (in the Y-direction in FIG. 2) are identical. The X-direction line LX1 in FIG. 2 passes through the centers of the Y-direction drive coils CYA and the CYB and extends in parallel with the X-direction sides 20X. The positions of the Y-direction drive coils CYA and CYB do not overlap in a direction parallel with the X-direction sides 20X (i.e., the positions in the X-direction in FIG. 2).

The pair of X-direction drive coils CXA and CXB are arranged symmetrically with respect to a straight line LC extending in parallel with the Y-direction sides 20Y and passing through the center of the effective image pickup area of the CCD 20. Likewise, the pair of Y-direction drive coils CYA and CYB are arranged symmetrically with respect to the straight line LC along the major sides of the CCD 20.

Figure 8:
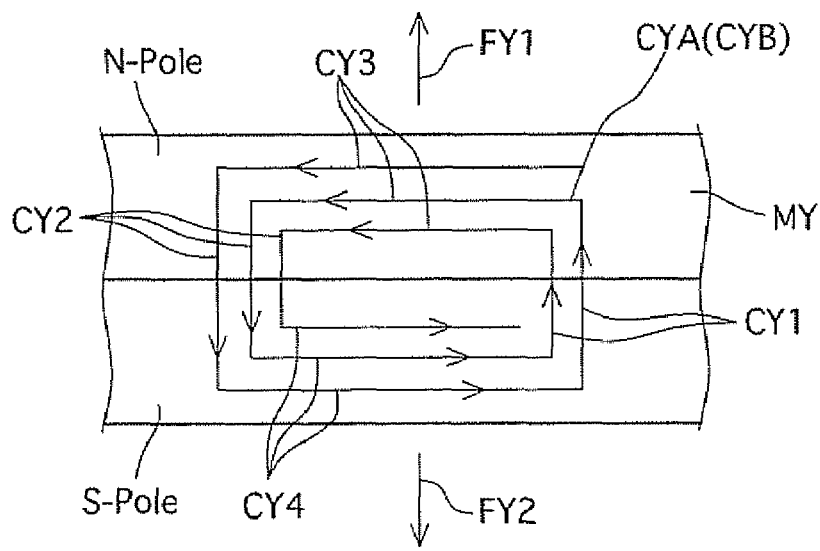
FIG. 8 is an enlarged schematic view of a main part of a Y-direction drive device.

As shown in FIGS. 2 and 8, the Y-direction drive coils CYA and CYB are spirally wound with each side extending linearly and are defined by the right sides CY1 the left sides CY2, the upper sides CY3 and the lower sides CY4. The right sides CY1 and the left sides CY2 are parallel with the Y-direction sides 20Y and the upper sides CY3 and the lower sides CY4 are parallel with the X-direction sides 20X. In FIGS. 2 and 8, the Y-direction drive coils CYA and CYB are provided with several turns for the sake of convenience, but the coils are, in practice, provided with several scores of turns. The Y-direction drive coils CYA, CYB, the yokes YY and the permanent magnets MY form a Y-direction drive device.

The movement extremity restriction device restricts the extremities of the movement of the circuit board 45 relative to the stationary support plate 30 within a predetermined range. The upper sides CY3 of the Y-direction drive coils CYA and CYB and the N-poles of the permanent magnets MY always overlap in the Z-direction and the lower sides CY4 and the S-poles of the permanent magnets MY always overlap in the Z-direction.

A Hall sensor (Y-direction displacement detection sensor) SYA located in the vicinity of the Y-direction drive coil CYA and a Hall sensor (Y-direction displacement detection sensor) SYB located in the vicinity of the Y-direction drive coil CYB are secured to the tongue 49. The Hall sensor SYB detects the displacement of the Y-direction drive coil CYA in the Y-direction, using the magnetic flux produced between the permanent magnet MY and the yoke YY. The Hall sensor SYB detects a change in the magnetic flux produced between the permanent magnet MY and the yoke YY to thereby detect the displacement of the Y-direction drive coil CYB in the Y-direction.

In this embodiment, as shown in FIG. 2, the Hall sensor SYA is located on the left side of the Y-direction drive coil CYA and the Hall second SYB is located on the right side of the Y-direction drive coil CYB. The Hall sensors SYA and SYB are located in the vicinity of the Y-direction drive coils CYA and CYB, respectively, and therefore, it is possible, for example, to arrange the Hall sensor SYA closely on the right side of the Y-direction drive coil CYA and to arrange the Hall sensor closely on the left side of the Y-direction drive coil CYB (It is also possible to arrange the Hall sensors SYA and SYB between the Y-direction drive coils CYA and CYB). However, in the arrangement in the illustrated embodiment, the linear distance between the Hall sensors SYA and SYB is increased in comparison with the arrangement in which the Hall sensors SYA and SYB are located between the Y-direction drive coils CYA and CYB. Namely, if the circuit board 45 rotates, a difference in the detection values between the Hall sensors SYA and SYB is made large, so that the amount of rotation can be more precisely detected, and hence, the rotational shake can be precisely corrected.

The operation when the Y-direction drive coils CYA and CYB are supplied with electricity is as follows. For example, if identical current in the direction indicated by arrows in FIG. 8 is supplied to the Y-direction drive coils CYA and CYB when the circuit board 45 is in the initial position shown in FIG. 2, identical linear forces in the direction FY1 are produced in the upper sides CY3 and the lower sides CY4 of the Y-direction drive coils CYA and CYB. Conversely, if identical current in a direction opposite to the direction indicated by arrows in FIG. 8 is supplied to the Y-direction drive coils CYA and CYB, identical linear forces in the direction FY2 are produced in the upper sides CY3 and the lower sides CY4 of the Y-direction drive coils CYA and CYB. The directions FY1 and FY2 are perpendicular to the upper sides CY3 and the lower sides CY4 and are determined with reference to the Y-direction drive coils CYA and CYB. When the circuit board 45 is in the initial position shown in FIG. 2, the directions FY1 and FY2 are opposite to each other and are in parallel with the Y-direction. Therefore, if the currents to be supplied to the Y-direction drive coils CYA and CYB are identical in quantity, the forces in the directions FY1 and FY2 produced in the Y-direction drive coils CYA and CYB are identical, and accordingly, the reinforcement plate 40 and the circuit board 45 are linearly moved in parallel in the direction FY1 with respect to the stationary support plate 30. The forces are produced in the right sides CY1 and the left sides CY2, however, these forces are cancelled out, and hence, no force is applied to the reinforcement plate 40 and the circuit board 45.

As mentioned above, the reinforcement plate 40 and the circuit board 45 are linearly moved in the direction FY1 or FY2 with respect to the yoke YY (stationary support plate 30) by controlling the direction of the current to be supplied to the Y-direction drive coils CYA and CYB.

If the power supply to the Y-direction drive coils CYA and CYB is stopped, the drive force in the direction FY1 and FY2 is no longer produced, and no movement of the reinforcement plate 40 and the circuit board 45 occurs. Since the quantity of the current supplied to the Y-direction drive coils CYA and CYB and the forces produced thereby are approximately proportional, the forces in the directions FY1 and FY2 can be increased by increasing the quantity of current to be supplied to the Y-direction drive coils CYA and CYB. It is possible to move the CCD 20 in the Y-direction at a speed corresponding to the speed of the image movement caused by camera shake in the Y-direction by controlling the current to be supplied to the Y-direction drive coils CYA and CYB by the control circuit.

Moreover, if the values of the current to be supplied to the Y-direction drive coils CYA and CYB are individually set, different forces are produced in the Y-direction drive coils CYA and CYB, and hence, the reinforcement plate 40 and the circuit board 45 are rotated relative to the stationary support plate 30.

In the embodiment discussed above, as the Y-direction drive coils CYA and CYB are juxtaposed in a direction parallel with the X-direction sides 20X (the X-direction in FIG. 2) below the CCD 20, the size of the reinforcement plate 40 and the circuit board 45 in the Y-direction can be reduced in comparison with, for example, the arrangement in which the Y-direction drive coil CYA is located above the CCD 20 and the Y-direction drive coil CYB is located below the CCD 20 (i.e., in the arrangement in which the Y-direction drive coils CYA and CYB do not overlap in a direction parallel with the X-direction sides 20X). The reduction in the size of the reinforcement plate 40 and the circuit board 45 in the Y-direction makes it possible to reduce the size of the digital camera 10 in the upward/downward direction.

Figure 14:
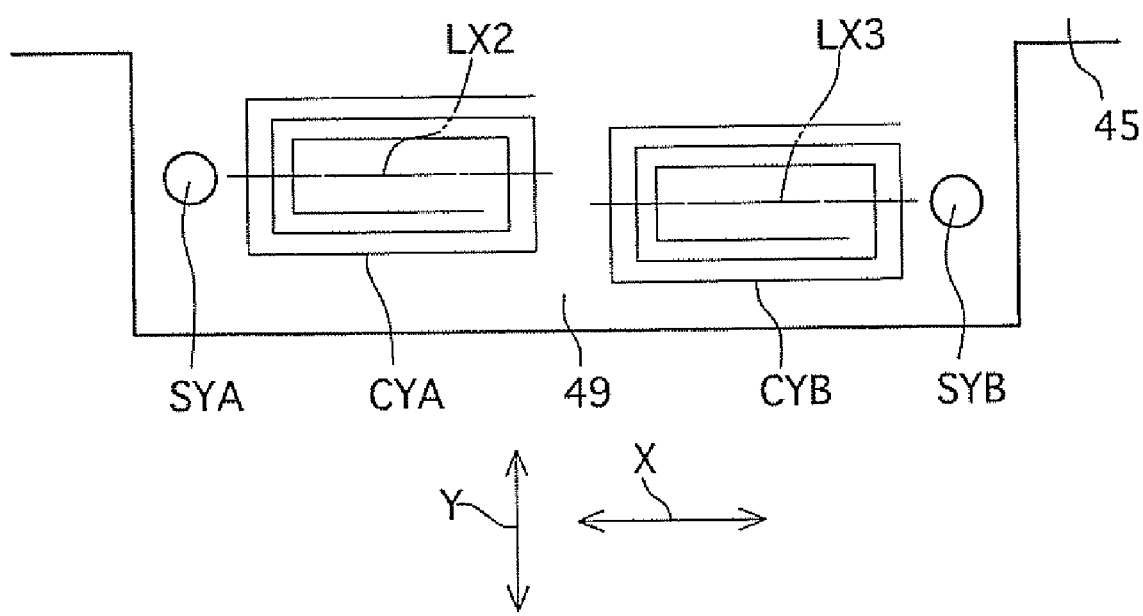
FIG. 14 is an enlarged rear view of a modified arrangement of Y-direction drive coils.

In the illustrated embodiment, the Y-direction drive coils CYA and CYB are juxtaposed in a direction parallel with the X-direction sides 20X (the centers of the Y-direction drive coils are located on the X-direction straight line LX1). Alternatively, instead of precisely aligning the Y-direction drive coils CYA and CYB in the direction parallel with the X-direction side 20X, it is possible to arrange both the Y-direction drive coils CYA and CYB above or below the CCD 20 (below the CCD in an embodiment shown in FIG. 14) and to arrange the Y-direction drive coils CYA and CYB so as not to overlap in a direction Y-direction side 20Y but to overlap in a direction parallel with the X-direction side 20X, as shown in FIG. 14 (the X-direction straight line LX2 passes through the center of the Y-direction drive coil CYA and extends in parallel with the X-direction side 20X; the X-direction straight line LX3 passes through the center of the Y-direction drive coil CYB and extends in parallel with the X-direction side 20Y; and positions of the X-direction straight line LX2 and the X-direction straight line LX3 in a direction parallel with the Y-direction side 20Y are different). With this alternative arrangement, the size of the reinforcement plate 40 and the circuit board 45 in the Y-direction can be reduced in comparison with the arrangement in which the Y-direction drive coil CYA is located above the CCD 20 and the Y-direction drive coil CYB is located below the CCD 20; however, the size of the reinforcement plate 40 and the circuit board 45 in the Y-direction is made slightly larger than that of the arrangement in which the Y-direction drive coils CYA and CYB are precisely aligned in a direction parallel with the X-direction side 20X.

Since the X-direction drive coils CXA, CXB and the Y-direction drive coils CYA, CYB are planar coils parallel with the X and Y directions, respectively, if the number of turns of the X-direction drive coils CXA, CXB and the Y-direction drive coils CYA, CYB are increased to increase the power, the lengths of the X-direction drive coils CXA, CXB and the Y-direction drive coils CYA, CYB are increased in the direction FX1 (FX2) and FY1 (FY2), respectively. However, if the number of turns of the X-direction drive coils CXA, CXB and the Y-direction drive coils CYA and CYB are increased, the lengths of the X-direction drive coils CXA, CXB and the Y-direction drive coils CYA, CYB are not increased in the direction of the optical axis O, and hence, the yokes YX and YY are not increased in size in the optical axis direction O. Therefore, no increase in the size of the digital camera 10 in the optical axis direction O occurs.

The sensors which detect the camera shake of the digital camera 10 is summarized as follows with reference to FIGS.

Figure 9:
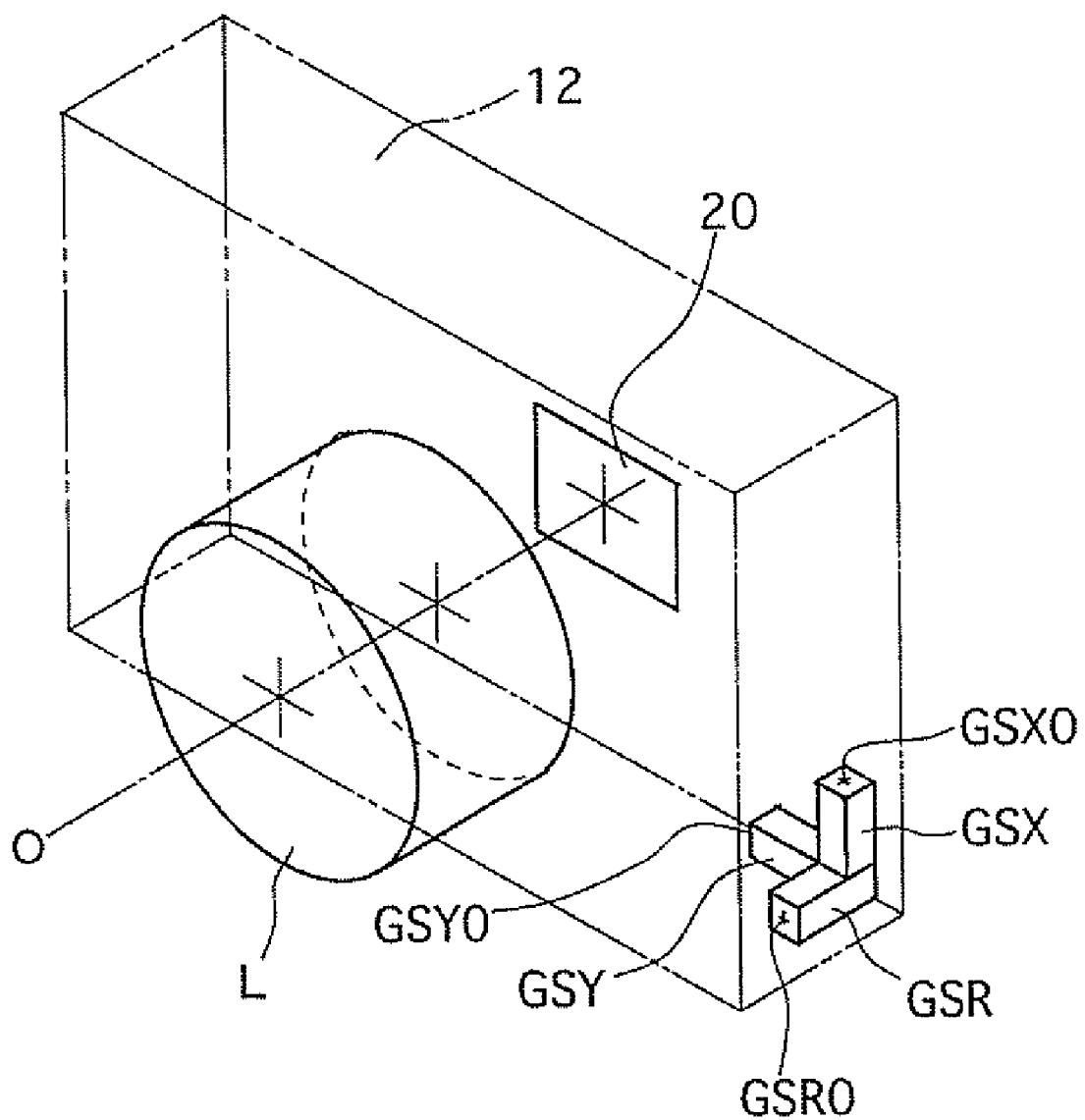
FIG. 9 is a perspective view of a camera body showing an example of the arrangement of gyro-sensors for detecting shake in the X and Y directions and the rotational shake about the optical axis.
Figure 10:
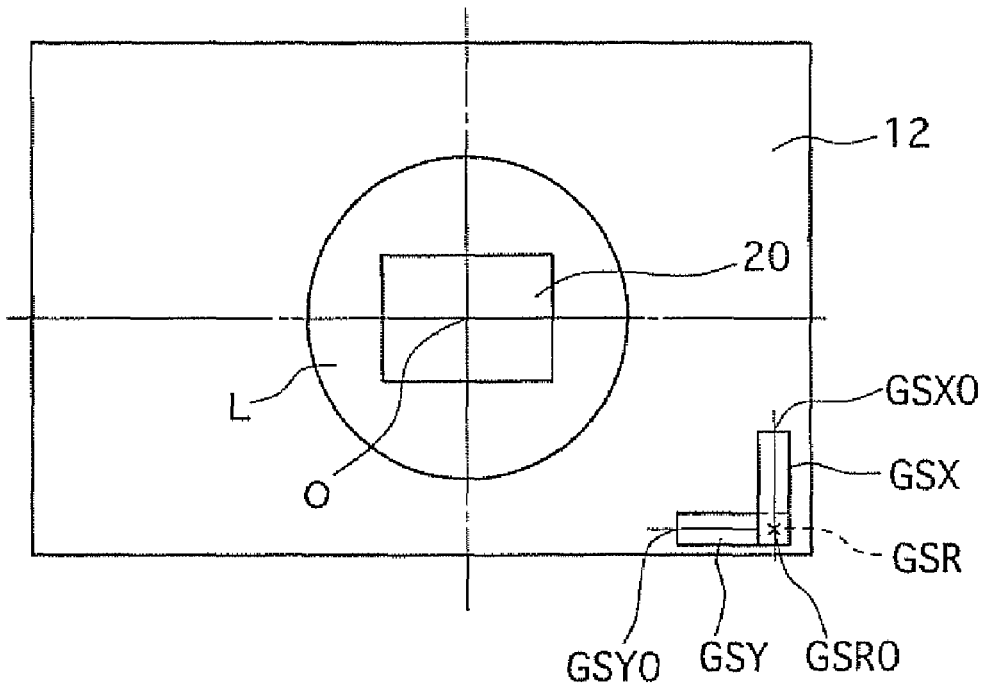
FIG. 10 is a front elevational view of a camera body.
Figure 11:
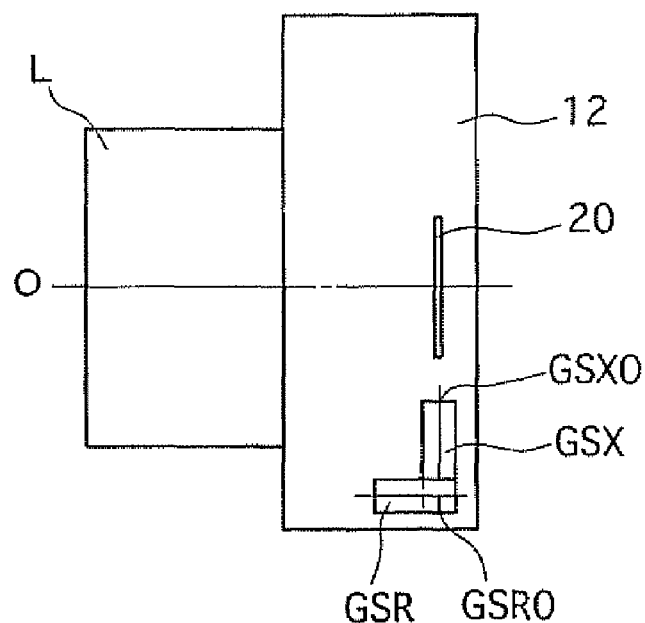
FIG. 11 is a side view of a camera body.

9 through 11. The digital camera 10 is provided with shake detection sensors for detecting the Y-direction (longitudinal direction) angular speed of the optical axis O in the form of a Y-direction gyro-sensor (Y-direction shake detection sensor) GSY, the X-direction (lateral direction) angular speed in the form of an X-direction gyro-sensor (X-direction shake detection sensor) GSX, and the rotation angular speed about the optical axis O in the form of a rotation detection gyro-sensor (rotational shake detection sensor) GSR. The arrangement of the Y-direction gyro-sensor GSY, the X-direction gyro-sensor GSX, and the rotation detection gyro-sensor GSR is shown in FIGS. 9 through 11, byway of example. In this example, the Y-direction gyro-sensor GSY, the X-direction gyro-sensor GSX, and the rotation detection gyro-sensor GSR are located at the right lower corner of the digital camera 10 in a front elevation. The Y-direction gyro-sensor GSY has a gyro-sensor axis GSYO extending in the lateral direction (parallel with the X-direction) and detects the angular speed about the gyro-sensor axis GSYO (X-axis), i.e., the Y-direction (longitudinal direction) angular speed of the camera body 12. The X-direction gyro-sensor GSX has a gyro-sensor axis GSXO extending in the longitudinal direction (parallel with the Y-direction) and detects the angular speed about the gyro-sensor axis GSXO (Y-axis), i.e., the X-direction (lateral direction) angular speed of the camera body 12. The rotation detection gyro-sensor GSR has a gyro-sensor axis GSRO extending parallel with the optical axis O (Z-direction) and detects the angular speed about the gyro-sensor axis GSRO (Z-axis), i.e., the angular speed about the optical axis O of the camera body 12.

The arrangement of the Y-direction gyro-sensor GSY, the X-direction gyro-sensor GSX, and the rotation detection gyro-sensor GSR, discussed above is only an example. The Y-direction gyro-sensor GSY, the X-direction gyro-sensor GSX, and the rotation detection gyro-sensor GSR may be constructed of individual sensors or a combination of a bi-axial gyro-sensor and a uni-axial gyro-sensor or a single tri-axial gyro-sensor. The arrangement of the Y-direction gyro-sensor GSY, the X-direction gyro-sensor GSX and the rotation detection gyro-sensor GSR is not limited to the illustrated embodiment. If the Y-direction gyro-sensor GSY, the X-direction gyro-sensor GSX and the rotation detection gyro-sensor GSR are individually provided, the freedom of arrangement is enhanced, and if the single tri-axial gyro-sensor is used, the assembling operation can be simplified The operation of the image movement correction apparatus 25 constructed as above will be discussed below with reference to a control circuit block shown in FIGS. 12 and 13. Note that if the control is carried out by a CPU, the operation of the integration circuit, the error amplification circuit, the PID (Proportional-Integral-Differential) computing circuit, the PWM driver can be performed by software. If the digital camera 10 is oscillated due to the shaking of the photographer's hand (hand shake), angular shake and rotational shake of the optical axis O (rotational shake in the reference plane) occur, resulting in the image movement. Such image movement is corrected by canceling the movement.

The object light transmitted through the photographing lens L (lenses L1 through L3) passes through the low-pass filter 52 through the opening 51 and is converged onto the image pickup surface 21 of the CCD 20 to form an object image. If camera shake of the digital camera 10 in the X and Y directions and about the optical axis O occurs when the image movement correction switch SW (FIG. 1) is turned ON, the output of the Y-direction gyro-sensor GSY, the X-direction gyro-sensor GSX, and the rotation detection gyro-sensor GSR are input to, and integrated by, the integration circuits 62, 60 and 61, respectively, so that outputs corresponding to angular shake in the X and Y directions and an output corresponding to rotational shake about the optical axis O are obtained.

Figure 12:
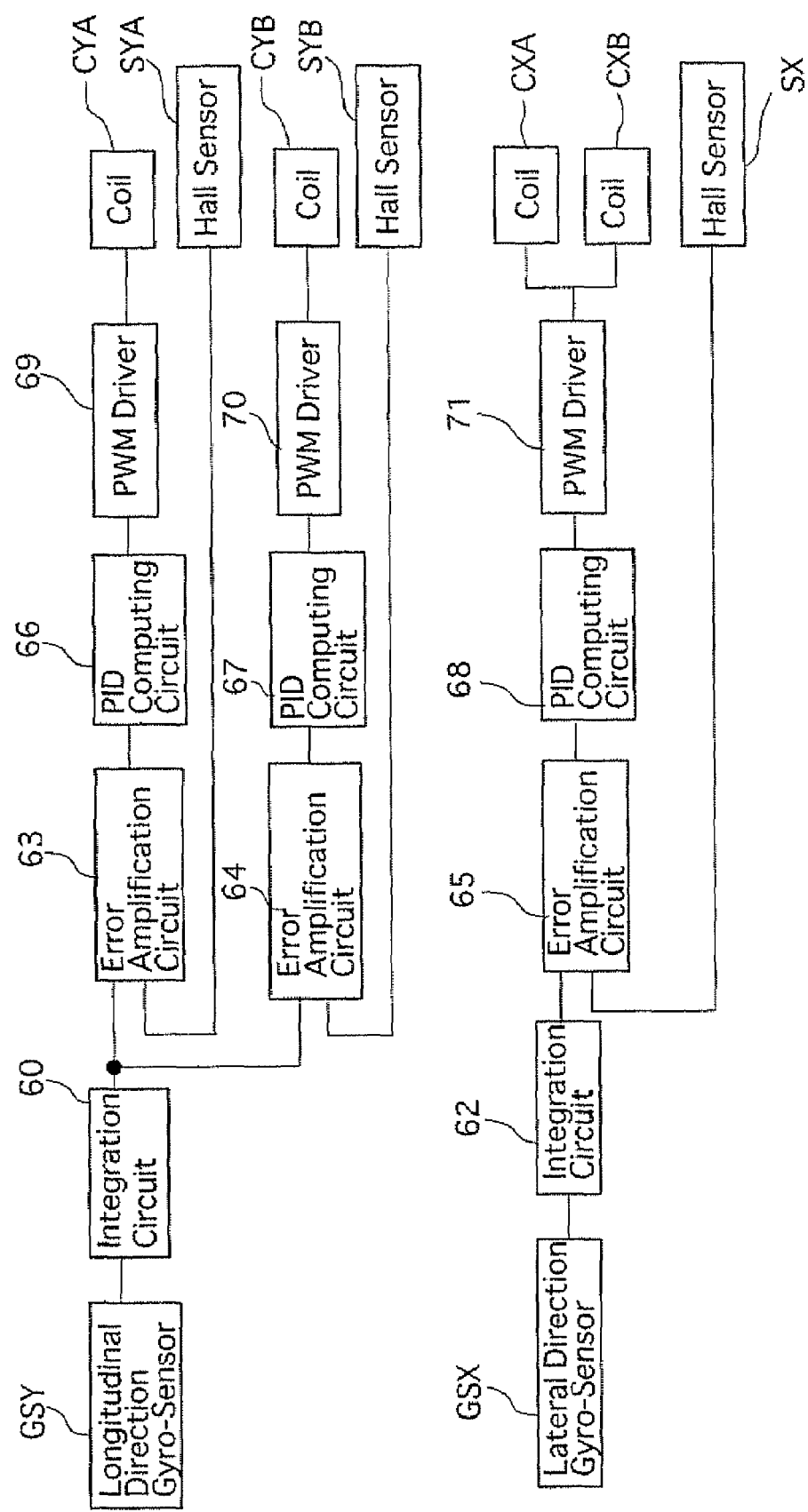
FIG. 12 is a block diagram of a control circuit for correcting image movements in the X and Y directions.

Firstly, the correction of the image movements in the X and Y directions wherein no correction of rotational shake is necessary will be discussed with reference to FIG. 12.

The output of the integration circuit 62 (lateral shake signal representing the shake of the digital camera 10 in the X-direction) and the output of the Hall sensor SX (X-direction displacement signal of the X-direction drive coils CXA and CXB relative to the stationary support plate 30) are compared in the error amplification circuit 65, so that a corresponding difference signal is output. In accordance with the output signal of the error amplification circuit 65, a PID calculation is carried out by the PID computing circuit 68. Consequently, a signal relating to the voltage to be applied to the X-direction drive coils CXA and CXB is calculated so that the difference between the outputs of the integration circuit 62 and the Hall sensor SX is reduced. The PWM pulses are applied to the X-direction drive coils CXA and CXB from the PWM driver 71 to the X-direction drive coils CXA and CXB in accordance with the PID computing circuit 68. Consequently, a drive force in the direction FX1 or FX2 is produced in the X-direction drive coils CXA and CXB. Thus, the CCD 20 (the reinforcement plate 40 and the circuit board 45) is moved in the direction FX1 or FX2 to reduce the difference between the output of the integration circuit 62 and the output of the Hall sensor SX.

Likewise, the output of the integration circuit 60 (longitudinal shake signal representing the shake of the digital camera 10 in the Y-direction) and the output of the Hall sensors SYA, SYB (Y-direction displacement signal of the Y-direction drive coils CYA and CYB relative to the digital camera 10) are compared in the error amplification circuits 63 and 64, respectively, so that corresponding difference signals are output. In accordance with the output signals of the error amplification circuits 63 and 641 a PID calculation is carried out by the PID computing circuits 66 and 67, respectively. Consequently, a signal relating to the voltage to be applied to the Y-direction drive coils CYA and CYB is calculated so that the difference between the outputs of the integration circuit 60 and the Hall sensors SYA and SYB is reduced. The PWM pulses are applied to the Y-direction drive coils CYA and CYB from the PWN drivers 69 and 70 in accordance with the PID computing circuits 66 and 67, respectively. Note that the magnitudes and directions of the PWM pulses to be applied to the Y-direction drive coils CYA and CYB are identical. Consequently, drive forces in the direction FY1 or FY2 are produced in the Y-direction drive coils CYA and CYB. Thus, the CCD 20 (the reinforcement plate 40 and the circuit board 45) is moved in the direction FY1 or FY2 to reduce the differences between the output of the integration circuit 60 and the output of the Hall sensor SYA and between the output of the integration circuit 60 and the output of the Hall sensor SYB.

It should be noted that the error amplification circuits 63, 64 and 65, and the PID computing circuits 66, 67 and 68 constitute a controller. Furthermore, the PWM drivers 69, 70 and 71, and the Y-direction drive coils CY and the X-direction drive coils CX constitute a drive device for moving and rotating the image pickup device (i.e. the CCD 20) along the reference plane via control of the above-described controller.

As can be understood from the foregoing, the CCD 20 (reinforcement plate 40 and the circuit board 45) is linearly moved in the direction FX1 or FX2 and in the direction FY1 or FY2 in accordance with the angular shake of the optical axis O due to camera shake. Consequently, the image movement on the CCD 20 due to camera shake can be reduced (corrected). Note that the image pickup surface 21 of the CCD 20 is always perpendicular to the optical axis O while the CCD 20 is linearly moved in the direction FX1 or FX2 and in the direction FY1 or FY2.

The rotational shake correcting operation will be discussed with reference to FIG. 13.

When rotational shake of the digital camera 10 about the optical axis O occurs, the output of the rotation detection gyro-sensor GSR is integrated by the integration circuit 61, so that an output corresponding to the rotational shake of the CCD 20 is obtained. The output detected by the Y-direction gyro-sensor GSY is input from the integration circuit 60 to the error amplification circuits 63 and 64. As can be seen in FIG. 13, a value obtained by adding the output of the Y-direction gyro-sensor GSY corresponding to the longitudinal shake and the output of the rotation detection gyro-sensor GSR corresponding to the rotational shake is input to the error amplification circuit 63. Likewise, a value obtained by subtracting the output of the rotation detection gyro-sensor GSR corresponding to the rotational shake from the output of the Y-direction gyro-sensor GSY corresponding to the longitudinal shake is input to the error amplification circuit 64.

The sum of the outputs of the integration circuits 60 and 61 and the output of the Hall sensors SYA are compared in the error amplification circuit 63, and the difference between the outputs of the integration circuits 60 and 61 and the output of the Hall sensor SYB are compared in the error amplification circuit 64. In accordance with the output signals of the error amplification circuits 63 and 64, a PID calculation is carried out by the PID computing circuits 66 and 67. Consequently, a signal relating to the voltage to be applied to the Y-direction drive coils CYA and CYB is calculated so that the difference between the sum of the outputs of the integration circuits 60 and 61 and the Hall sensors SYA is reduced, and the difference between the difference between the outputs of the integration circuits 60 and 61 and the output of the Hall sensor SYB is reduced. The PWM pulses are applied to the Y-direction drive coil CYA from the PWM driver 69 in accordance with the calculation result in the PID computing circuits 66 and 67. Likewise, the PWM pulses are applied to the Y-direction drive coil CYB from the PWM driver 70. Consequently, a difference in the drive force between Y-direction drive coils CYA and CYB is produced. Accordingly, the CCD 20 (the reinforcement plate 40 and the circuit board 45) is rotated in the direction FY1 or FY2 relative to the stationary support plate 30 about an axis parallel with the optical axis O to correct the rotational shake of the digital camera 10.

For clarity, the control to correct the image movement in the X and Y directions and the control to correct the rotational movement of the image have been separately discussed above. However, in general, these image movements occur at the same time, so that the control to correct the image movement in the X and Y directions and the control to correct the rotational movement of the image are carried out concurrently.

In the illustrated embodiment, the yokes YX and YY (and the permanent magnets MX and MY) are provided on the stationary support plate 30 and the X-direction drive coils CXA and CXB, the Y-direction drive coils CYA and CYB, and the Hall sensors SX, SYA and SYB are provided on the circuit board 45. However, it is possible to provide the X-direction drive coils CXA, CXB (in case of correction of rotation, a plurality of X-direction drive coils are provided), the Y-direction drive coils CYA, CYB (in case of correction of rotation, a plurality of Y-direction drive coils are provided), the Hall sensors SX, SYA, SYB on the stationary support plate 30 and to provide the yoke YX and/or the yoke YY (and permanent magnets MX, MY) on the circuit board 45 (circuit board 85, 110). Note that the Hall sensors SX, SYA and SYB can be secured to the circuit board 45 in the vicinity of the yokes YX and YY. If a plurality of yokes YX are provided on the circuit board 45, the plurality of yokes YX do not overlap in a direction parallel with the X-direction side 20X but overlap in a direction parallel with the Y-direction side 20Y (the yokes can be precisely arranged in a direction parallel with the Y-direction side 20Y) and are secured to the circuit board 45 along the right or left Y-direction side 20Y.

A plurality of yokes YY can be provided so as not to overlap in a direction parallel with the Y-direction side 20Y and so as to overlap in a direction parallel with the X-direction side 20X (the yokes YY can be precisely arranged in a direction parallel with the X-direction side 20X) and can be secured to the circuit board 45 (circuit board 85 or 110) along the right or left Y-direction side 20Y.

Figure 19:
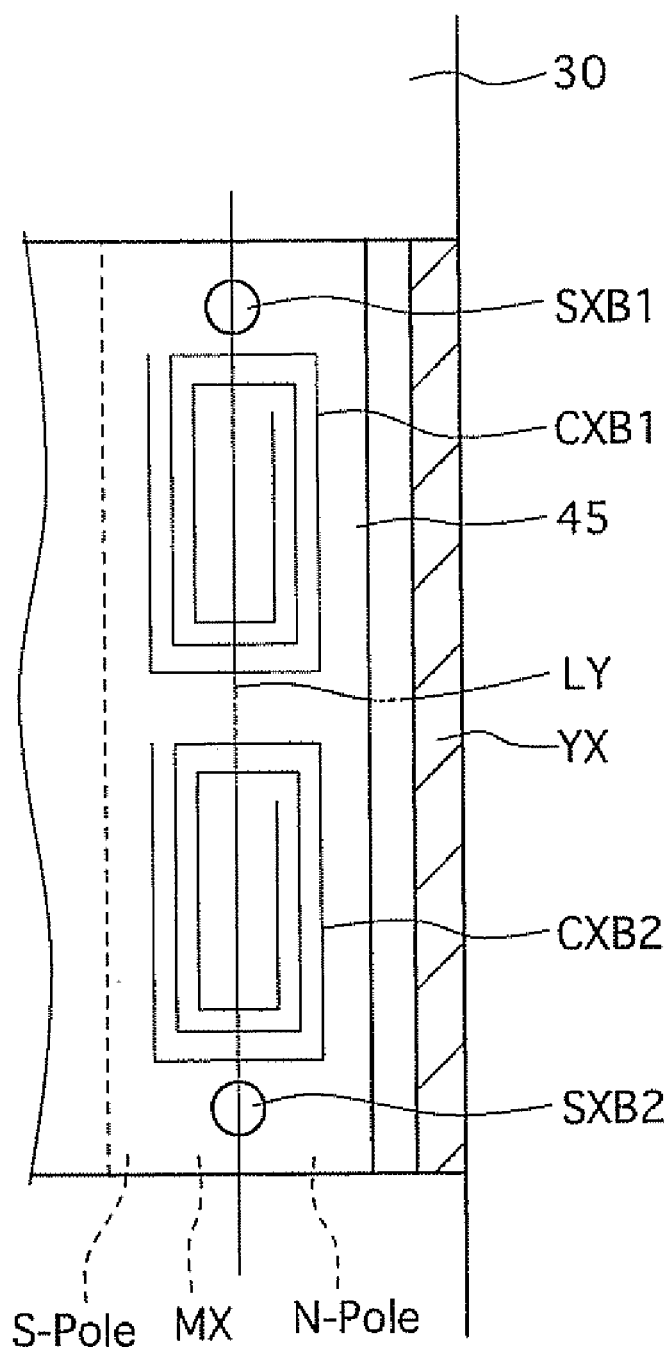
FIG. 19 is an enlarged rear view of a main part of a modified embodiment in which the rotation correction is carried out by two X-direction drive coils.

If coils similar to the Y-direction drive coils CYA and CYB are provided above the CCD 20 at rotational symmetrical positions with respect to the Y-direction drive coils CYA and CYB, the rotational-shake center can be easily determined and the drive force can be increased. Although the Y-direction drive coils CYA and CYB also serve as coils for rotating the CCD 20 in the illustrated embodiment, it is alternatively possible to provide the X-direction drive coils CXA and CXB so as to have the same structure as the Y-direction drive coils CYA and CYB whereby the X-direction drive coils would also serve as coils for rotating the CCD 20. In this alternative, as shown in FIG. 19, a pair of X-direction drive coils CXB1, CXB2 parallel with the reference plane are printed on the circuit board 45 so as to be located on the right or left side of the CCD 20. The X-direction drive coils CXB1 and CXB2 are juxtaposed in a direction parallel with the Y-direction side 20Y of the CCD 20 and do not overlap in a direction parallel with the X-direction side 20X. Furthermore, a Hall sensor SXB1 to detect the displacement of the X-direction drive coil CXB1 in the X-direction is secured to the circuit board 45, immediately above (in the vicinity of) the X-direction drive coil CXB1. Likewise, a Hall sensor SXB2 to detect the displacement of the X-direction drive coil CXB2 in the X-direction is secured to the circuit board 45, immediately below (in the vicinity of) the X-direction drive coil CXB2.

If the rotational shake is corrected by at least three of the X-direction drive coils CX (CXA, CXB) (or at least three yokes YX in the case of the yokes YX being secured to the reinforcement plate 40), the drive coils are not positioned so as to overlap in a direction parallel with the X-direction side 20X but overlap (be aligned) in a direction parallel with the Y-direction side 20Y, and the Hall sensors are secured in the vicinity of the outermost X-direction drive coils for correcting the rotational shake, that are spaced at the maximum distance from one another.

Although the gyro-sensors are used as shake detection sensors for detecting the shake of the optical axis and the rotation about the optical axis in the embodiments discussed above, the shake detection sensors are not limited to gyro-sensors and can be constructed from inclination sensors or azimuth sensors, etc. Moreover, although the Hall sensors are used for the X-direction displacement sensors and the Y-direction displacement sensors in the above-mentioned embodiments, it is possible to use sensors other than the Hall sensors. For example, MR sensors or two-dimensional PSD sensors can be used.

The illustrated stage apparatus for the image movement correcting apparatus 25 according to the present invention is adapted to support the image pickup device so as to move in the longitudinal and lateral directions and to rotate in a plane perpendicular to the optical axis. However, the stage apparatus which can be applied to the image movement correcting apparatus according to the present invention is not limited to that in the illustrated embodiment. An apparatus in which a stage member is movable and rotatable on a reference plane parallel with the X and Y directions can be used.

A second embodiment of a stage apparatus according to the present invention will be discussed below with reference to FIG. 15. The components corresponding to those in the first embodiment are designated with like reference numerals and no duplicate explanation therefor will be given.

Figure 15:
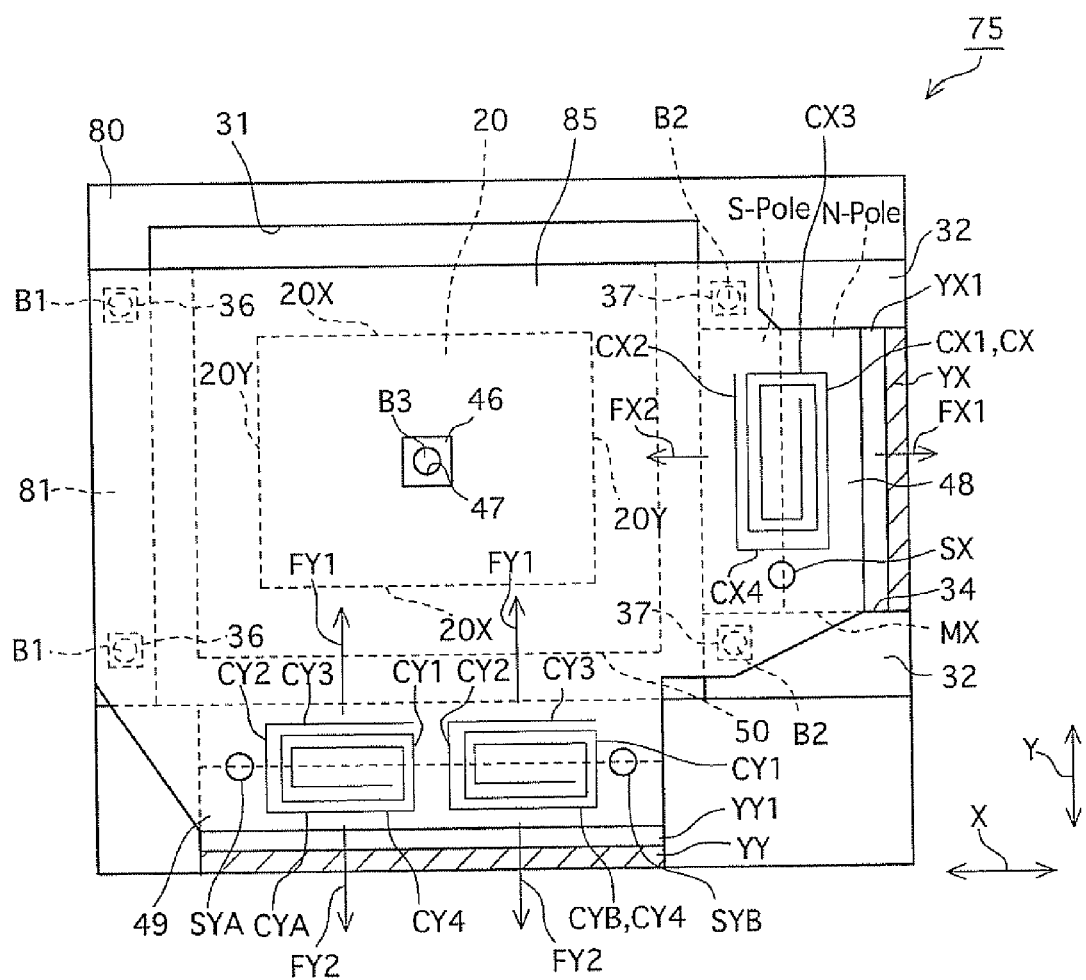
FIG. 15 is a back view of an image movement correcting apparatus in an inoperative position, in which yokes are partially sectioned, according to a second embodiment of the present invention.

In the second embodiment, the image movement correction apparatus 75 includes a single X-direction drive coil CX1 (provided on the right side in FIG. 15). Consequently, the stationary support plate 80 and the circuit board 85 are different in shape from the stationary support plate 30 and the circuit board 45 of the first embodiment. The portion of the stationary support plate 80 located on the left side of the receiving opening 31 is shorter in the X-direction than that of the stationary support plate 30 and is provided on its rear surface with a single projection 81 instead of the pair of projections 33 of the first embodiment. A pair of upper and lower support projections 36 are provided on the rear surface of the projection 81. The circuit board 85 is shorter in the X-direction than the circuit board 45. Moreover, the circuit board 85 has no tongue 47 and the shape of the tongue 49 is slightly different from that of the stationary support plate 30. The X-direction drive coil CX is provided only on the tongue 48 (the right side CX1 and the left side CX2 are parallel with the Y-direction side 20Y, and the upper side CX3 and the lower side CX4 are parallel with the X-direction side 20X). The reinforcement plate (not shown) secured to the front surface of the stationary support plate 80 is identical in shape with that of the stationary support plate 30.

In the second embodiment, the X-direction drive coil CX and the yoke YX are adapted to apply linear drive force to the stationary support plate 80 in the direction FX1 or FX2 and do not apply a rotating force thereto. Therefore, it is possible to provide a single X-direction drive coil CX and a single yoke YX.

The image movement correcting apparatus 75 of the second embodiment is controlled in accordance with the same control circuit as that of the first embodiment.

A third embodiment of the present invention will be discussed with reference to FIG. 16. The basic structure of the image movement correcting apparatus 90 in the third embodiment is the same as that of the image movement correcting apparatus 25 in the first embodiment. The elements corresponding to those in the first embodiment are designated with like reference numerals and no explanation therefor will be given hereinafter.

The portion of a stationary support plate 100 located on the left side of the receiving opening 31 in this embodiment is shorter in the X-direction than that of the stationary support plate 30 in the first embodiment. The stationary support plate 100 is provided with a single projection 101 instead of the pair of projections 33 of the first embodiment and is provided with a pair of upper and lower projections 102 instead of the pair of projections 32. The projection 101 is provided on its rear surface with a pair of upper and lower support projections 36 and the upper and lower projections 102 are provided on the rear surfaces with support projections 37.

The circuit board 110 is shorter in the X-direction than the circuit board 45 and is provided with tongues 111 and 112. The tongue 111 is located between the front plate portion YX1 and the rear plate portion YX2 of the yoke YX. The tongue 112 is located between the front plate portion YY1 and the rear plate portion YY2 of the yoke YY. The tongue 111 is provided with a printed X-direction drive coil CX which is a planar coil parallel with the reference plane, and the tongue 112 is provided with printed Y-direction drive coils CYC and CYD which are planar coils parallel with the reference plane.

One of the most significant features of the image movement correcting apparatus 90 in this embodiment is Y-direction drive coils CYC and CYD, which have different shapes.

Figure 16:
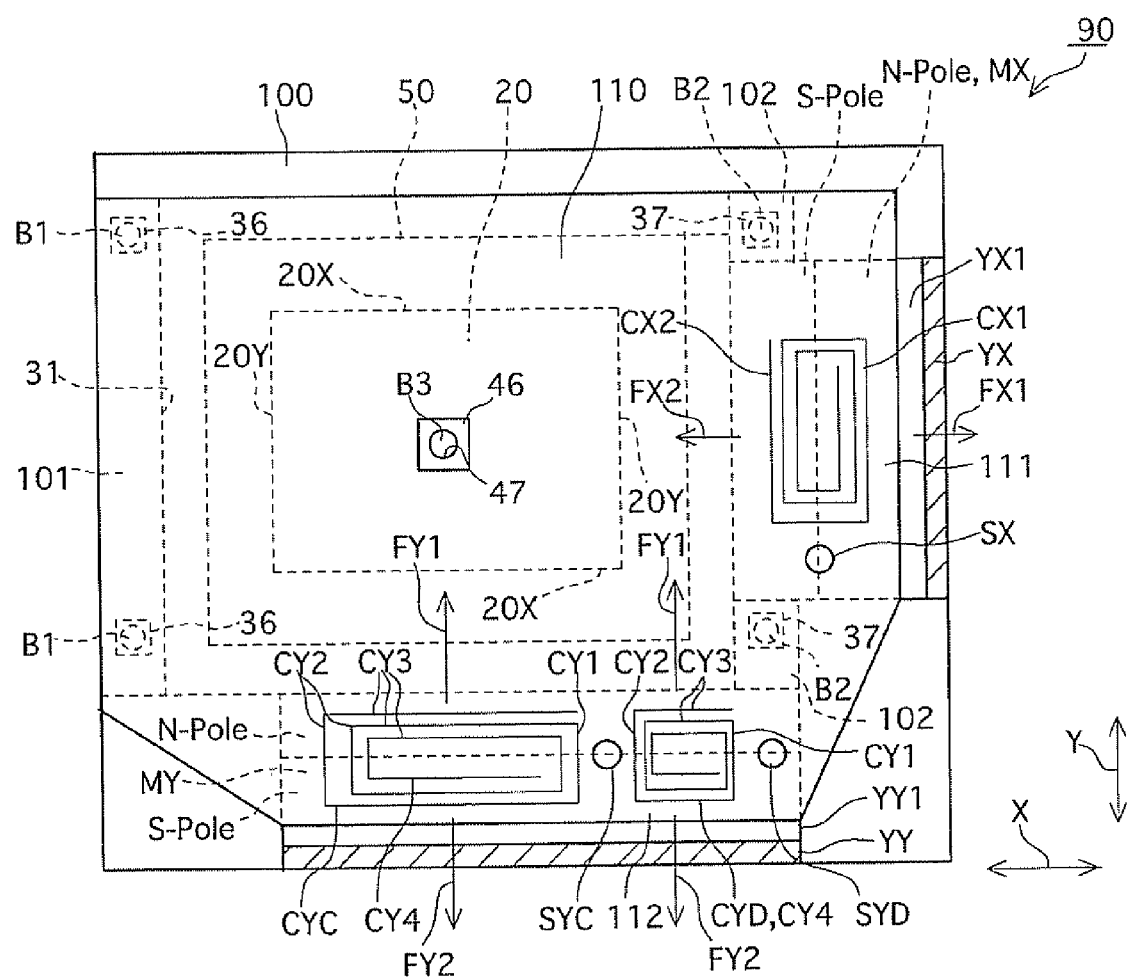
FIG. 16 is a back view of an image movement correcting apparatus in an inoperative position, in which yokes are partially sectioned, according to a third embodiment of the present invention.

The Y-direction drive coils CYC and CYD are juxtaposed in a direction parallel with the X-direction side 20X (or in the X-direction when the circuit board 110 is in the initial position shown in FIG. 16). The positions of the Y-direction drive coils CYC and CYD in a direction parallel with the Y-direction side 20Y (or in the Y-direction when the circuit board 110 is in the initial position shown in FIG. 13) are identical. Moreover, the length of the Y-direction drive coil CYC in a direction parallel with the X-direction side 20X is longer than the length of the Y-direction drive coil CYD in a direction parallel with the X-direction side 20X. The tongue 112 is provided with a Hall sensor (Y-direction displacement detection sensor) SYC on the close right side of the Y-direction drive coil CYC, and the tongue 112 is provided with a Hall sensor (Y-direction displacement detection sensor) SYD on the close right side of the Y-direction drive coil CYD. The Hall sensor SYC detects 5 the displacement of the Y-direction drive coil CYC in the Y-direction and the Hall sensor SYD detects the displacement of the Y-direction drive coil CYD in the Y-direction. Note that the Y-direction drive coils CYC and CYD are each defined by the right side CY1, the left side CY2, the upper side CY3 and the lower side CY4, similar to the Y-direction drive coils CA and CYB. The right side CY1 and the left side CY2 are parallel with the Y-direction side 20Y and the upper side CY3 and the lower side CY4 are parallel with the X-direction side 20X. Moreover, the upper side CY3 is always overlaps the N-pole of the magnet MY in the Z-direction and the lower side CY4 always overlaps the S-pole of the magnet MY n the Z-direction, due to the movement extremity restriction device. When current is supplied to the Y-direction drive coils CYC and CYD, the drive force in the direction FY1 or FY2 perpendicular to the upper side CY3 and the lower side CY4 is produced in the Y-direction drive coils CYC and CYD.

Figure 13:
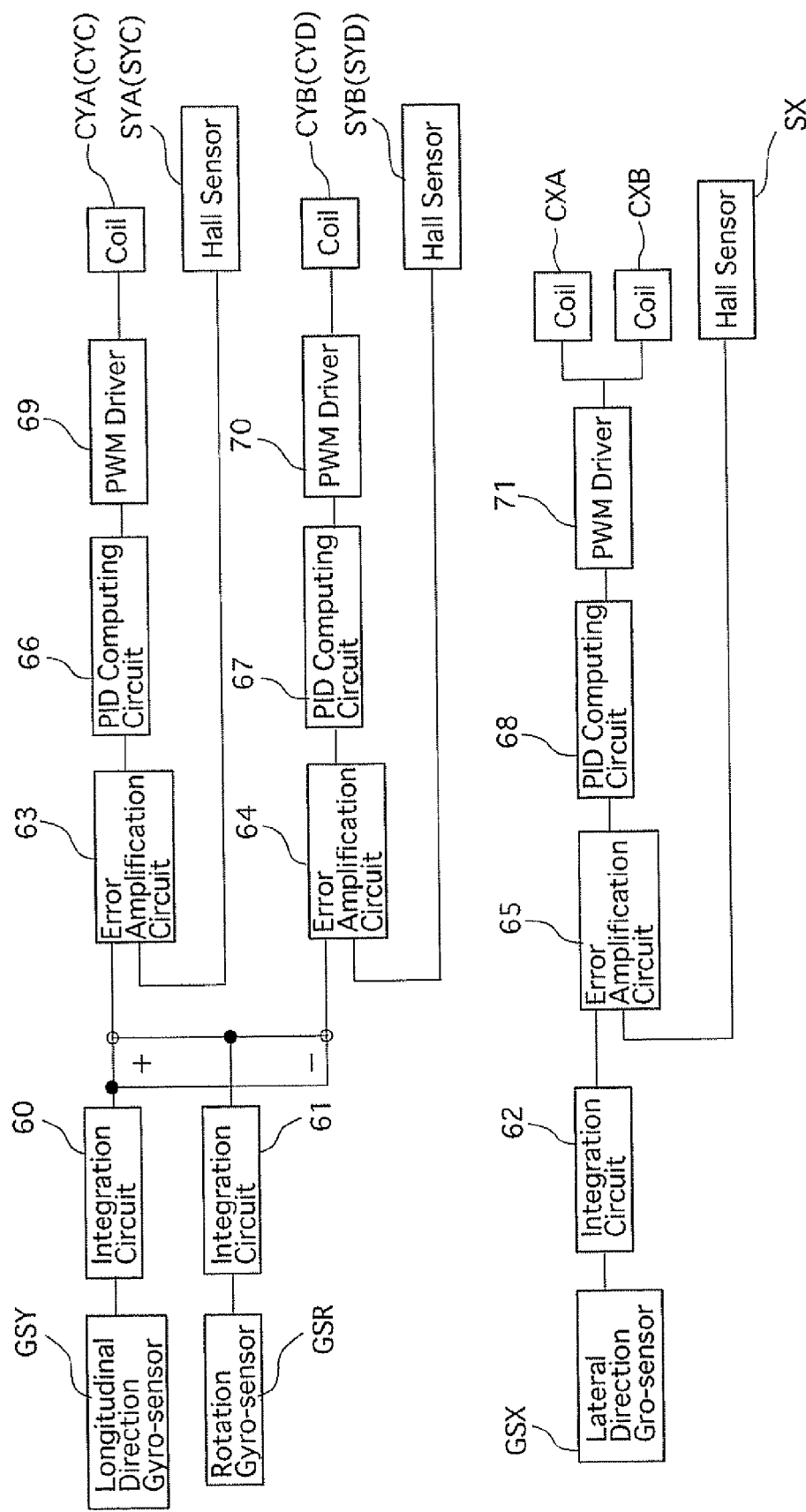
FIG. 13 is a block diagram of a control circuit for correcting the image movements in the X and Y directions and the rotation about an axis parallel with the optical axis.

The block diagram of the control circuits for correcting the camera shake in the X-direction and in the Y-direction and the rotational shake is the same as the block diagram shown in FIG. 13.

In the block diagram shown in FIG. 13, the Y-direction drive coil CYA is replaced with the Y-direction drive coil CYC, the Y-direction drive coil CYB is replaced with the Y-direction drive coil CYD, the Hall sensor SYA is replaced with the Hall sensor SYC, and the Hall sensor SYB is replaced with the Hall sensor SYD, respectively. If camera shake in the Y-direction occurs (if the Y-direction angular speed sensor GSY detects shake in the Y-direction), the output of the integration circuit 61 is supplied to the error amplification circuit 64, so that current is supplied to the Y-direction drive coil CYC. Consequently, the circuit board 110 (CCD 20) is moved in the direction FY1 or FY2 with respect to the yoke YY (the stationary support plate 100) to thereby correct the image movement.

If rotational shake takes place (if the rotation detection gyro-sensor GSR detects the rotational shake), the output of the integration circuit 61 is sent to the error amplification circuits 63 and 64, so that the drive force in the direction FY1 is produced in one of the Y-direction drive coils CYC and CYD, and the drive force in the direction FY2 is produced in the other Y-direction drive coil CYD or CYC to thereby rotate the circuit board 110.

In the third embodiment, to linearly move the circuit board 110 in the Y-direction, the current is supplied only to the Y-direction drive coil CYC which is longer in a direction parallel with the X-direction side 20X than the Y-direction drive coil CYD and produces a force larger than that produced in the Y-direction drive coil CYD for the same quantity of current. To correct rotational shake, the current is supplied not only to the Y-direction drive coil CYC but also to the Y-direction drive coil CYD. Therefore, the control is simplified in comparison with the supply of the current to the two Y-direction drive coils to linearly move the circuit board in the Y-direction.

Although the above discussion has been addressed to various embodiments, the present invention is not limited thereto and can be variously modified.

Figure 17:
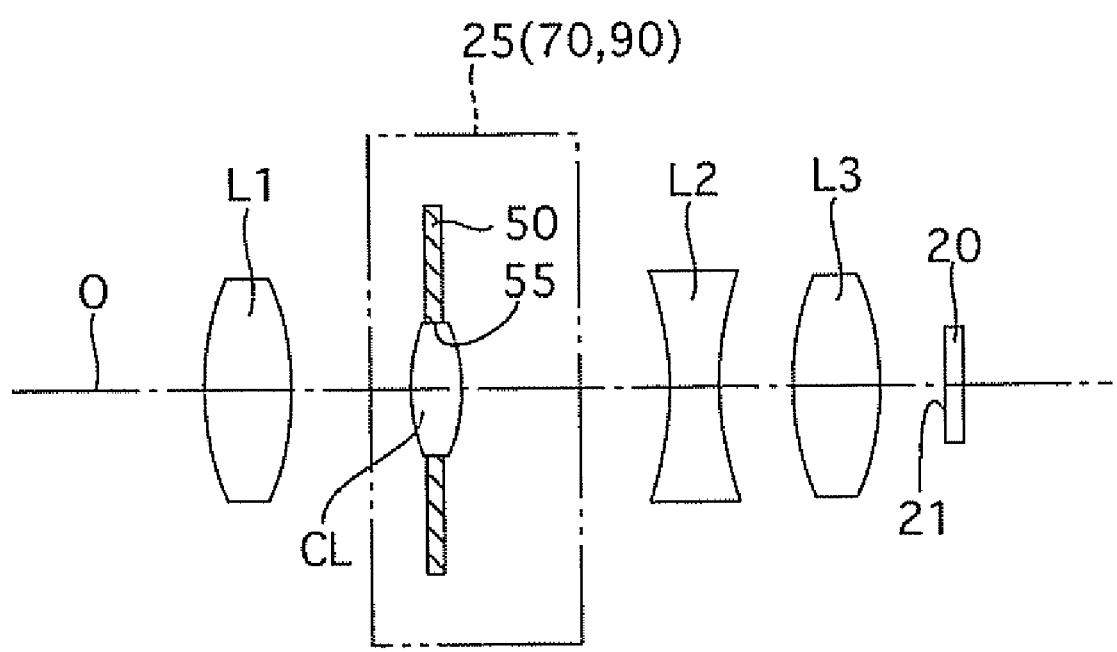
FIG. 17 is a schematic side view of a modified embodiment using a correction lens.

Although the CCD 20 is secured to the CCD holder 50 in the illustrated embodiment, it is possible to provide the CCD 20 behind the stationary support plate 30 (80 or 100) and to form a circular mounting hole 55 in the CCD holder 50, so that the correction lens CL which is circular in a front elevation is fitted and secured in the mounting hole 55, and is located between the lens L1 and the lens L2 (or between the lens L2 and the lens L3), as shown in FIG. 17. In this arrangement, the image movement (image rotation) can be corrected by moving the correction lens CL in the reference plane. Furthermore, the image movement correcting apparatus using the correction lens CL can be applied to a silver-halide film camera, without providing the CCD 20.

Figure 18:
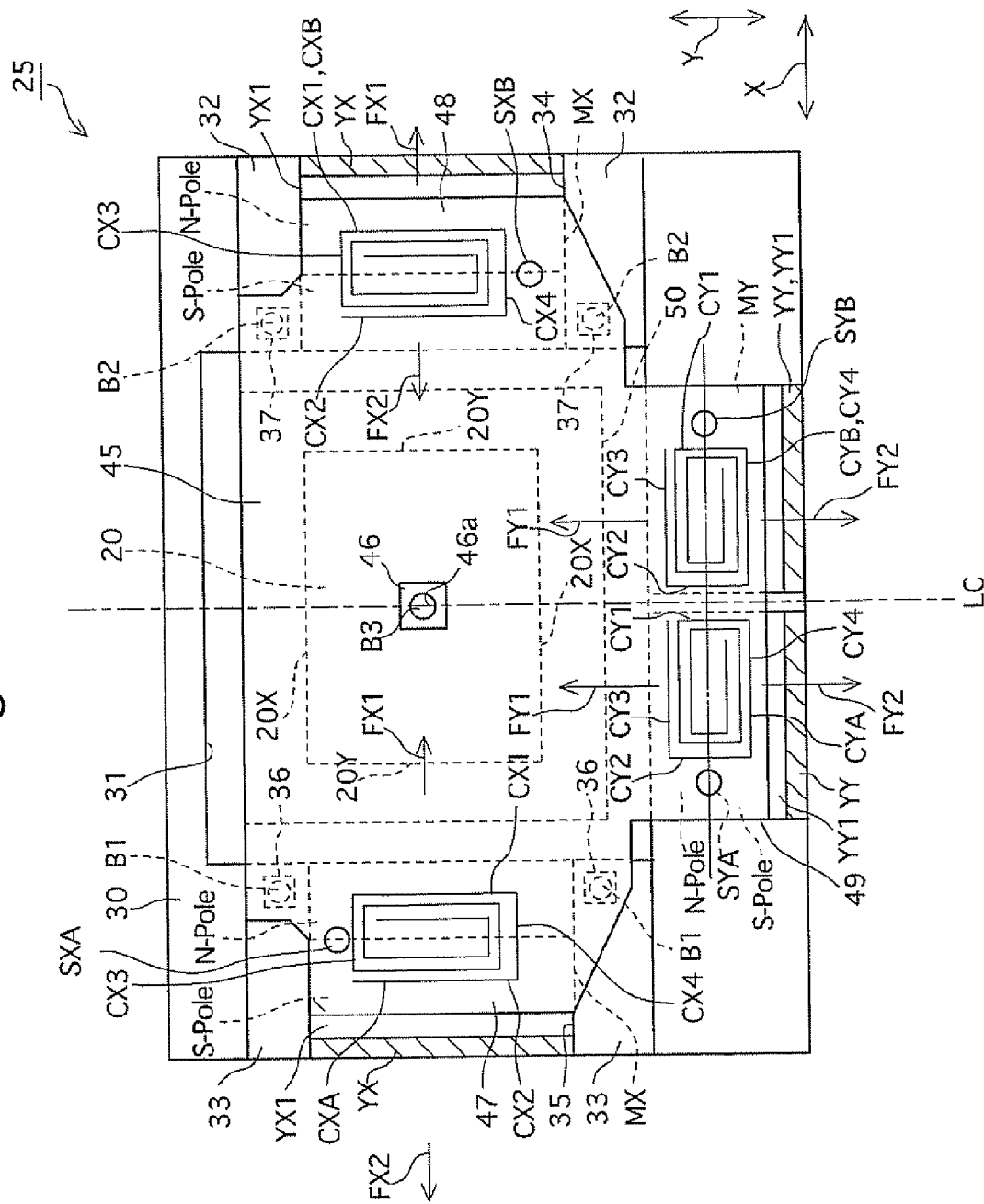
FIG. 18 is a back view, similar to FIG. 2, according to a modified embodiment in which two Y-direction drive coils are juxtaposed.

In the embodiments mentioned above, the plurality of Y-direction drive coils CYA, CYB, CYC, CYD are formed on the circuit board, whereas the single yoke YY is secured to the stationary support plate. Alternatively, as shown in FIG. 18, it is possible to provide a plurality of yokes YY (a pair of yokes YY in FIG. 18).

In the above mentioned embodiments, the yokes YX and YY (and the permanent magnets MX and MY) are provided on the stationary support plate 30 (or the stationary support plate 80 or 100) and the X-direction drive coils CX, the Y-direction drive coils CYA, CYB, CYC and CYD, the Hall sensors SX, SYA, SYB, SYC and SYD are provided on the circuit board 45 (or the circuit board 85 or 110). However, it is possible to provide the X-direction drive coil CX (or plurality of X-direction drive coils if the X-direction drive coils are used for correcting rotational shake), the Y-direction drive coil CYA, CYB, CYC or CYD (or plurality of Y-direction drive coils if they are used to correct rotational shake), the Hall sensors SX, SYA, SYB, SYC and SYD on the stationary support plate 30 (or the stationary support plate 80 or 110) and to provide one or a plurality of yokes YX and YY (and the permanent magnets MX and MY) on the circuit board 45 (or the circuit board 85 or 110). The Hall sensors SX, SYA, SYB, SYC, SYD may be secured to the circuit board 45 (85 or 110) and in the vicinity of the yokes YX and YY. If a plurality of yokes YX are provided on the circuit board 45 (or 85 or 110), the yokes do not overlap in a direction parallel with the X-direction side 20X and overlap in a direction parallel with the Y-direction side 20Y (the yokes may be precisely aligned in a direction parallel with the Y-direction side 20Y), and the yokes are secured to the circuit board 45 (85 or 110) along the right or left Y-direction side 20Y.

If a plurality of yokes YY are provided, the plurality of yokes do not overlap in a direction parallel with the Y-direction side 20Y and overlap in a direction parallel with the X-direction side 20X, and the yokes are secured to the circuit board 45 (85 or 110) along the upper or lower X-direction side 20X.

It is also possible to carry out the rotation correction by a plurality of X-direction drive coils CX. In this case, as shown in FIG. 18, the pair of X-direction drive coils CXA and CXB parallel with the reference plane are located on the right or left side of the CCD 20 (on the right side in the embodiment shown in FIG. 18) and are printed on the circuit board 45 (or 85 or 110). The X-direction drive coils CXA and CXB are aligned in a direction parallel with the Y-direction side 20Y of the CCD 20 (not shown in FIG. 18). Note that the straight line LC in FIG. 18 passes through a line of symmetry between the X-direction drive coils CXA and CXB and extends in parallel with the Y-direction side 20Y. The X-direction drive coils CXA and CXB are provided at symmetrical positions with respect to the straight line LC so as to be symmetrical in a direction parallel with the X-direction side 20X. The Hall sensor SXA for detecting the displacement of the X-direction drive coil CXA in the X-direction is secured to the circuit board 45 (85 or 110) immediately above (in the vicinity of) the X-direction drive coil CXA. The Hall sensor SXB for detecting the displacement of the X-direction drive coil CXB in the X-direction is secured to the circuit board 45 (or 85 or 110) immediately below (in the vicinity of) the X-direction drive coil CXB.

Note that, as in the embodiment shown in FIG. 14, it is possible to deviate the positions of the X-direction drive coils CXA and CXB in a direction parallel with the X-direction side 20X without precisely aligning the X-direction drive coils CXA and CXB in a direction parallel with the Y-direction side 20Y so that the X-direction drive coils CXA and CXB overlap in a direction parallel with the Y-direction side 20Y.

It is also possible to secure the plurality of X-direction drive coils CX to the stationary support plate and to secure the plural yokes YX (and magnets) to the circuit board (reinforcement plate).

Moreover, although the two Y-direction drive coils CYA and CYB or CYC and CYD are provided to correct rotational shake in this embodiment, it is possible to provide three or more yokes (or yokes YY if they are secured to the reinforcement plate 40 and the circuit board 85 or 110) and to overlap the yokes in a direction parallel with the X-direction side 20X without overlapping in a direction parallel with the Y-direction side 20Y. In this alternative arrangement, the Hall sensors are provided in the vicinity of the outermost Y-direction drive coils for correcting rotational shake, that are spaced at the largest distance. Likewise with providing the two Y-direction drive coils (FIG. 2), all the Y-direction drive coils are located between the Hall sensors. With this arrangement, since the distance between the Hall sensors is increased, a precise rotation correction can be achieved.

If more than two X-direction drive coils CX (or yokes YX if they are secured to the reinforcement plate 40 and the circuit board 85 or 110) are provided to correct rotational shake, the X-direction drive coils do not overlap in a direction parallel with the X-direction side 20X and overlap (or are aligned) in a direction parallel with the Y-direction side 20Y. The Hall sensors are secured in the vicinity of the outermost X-direction drive coils for correcting the rotation, that are spaced at the largest distance. As in the arrangement of the Y-direction drive coils, all the X-direction drive coils are located between the Hall sensors.

Although the positive signal is supplied to the error amplification circuit 63 and the negative signal is supplied to the error amplification circuit 64, in the control circuit block diagram shown in FIG. 13, it is possible to supply identical signals to the error amplification circuits 63 and 64 and to make the magnitudes of the drive forces produced in the Y-direction drive coils CYA and CYB (drive forces produced in the Y-direction drive coils CYC and CYD) different from one another. With this arrangement, as the circuit board 45 or 110 rotates in the reference plane, the image rotation can be corrected.

Furthermore, although the Hall sensors are used to detect the displacement in the X and Y directions in the above-mentioned embodiments, it is possible to use, for example, MR sensors or MI sensors other than the Hall sensors.

The above embodiments are applied to the image movement correcting apparatus 25, 75 or 90, however, the stage apparatus of the present invention is not limited thereto. For example, the present invention can be applied to an apparatus in which the stage member is freely moved on the reference plane parallel with the X and Y directions.

According to the present invention, a rotatable stage apparatus can be miniaturized by improving the arrangement of the plurality of magnetic flux generating devices or the plurality of drive coils, secured to the stage member.

According to an image movement correction apparatus of the present invention, since the image pickup device is supported so as to move and rotate in a plane perpendicular to the optical axis, the support mechanism therefor can be simplified. Furthermore, since the image pickup device is rotated in accordance with the detection of shake about the optical axis of the photographing optical system, not only the longitudinal shake and the lateral shake but also rotational shake about an axis parallel with the optical axis of the photographing optical system can be corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A stage apparatus comprising:
    a stationary support plate;
    a stage member provided on the stationary support plate so as to move on a reference plane parallel with the stationary support plate;
    a plurality of Y-direction magnetic flux generators secured to one of said stationary support plate and said stage member; and
    a plurality of Y-direction moving coils secured to the other of said stationary support plate and said stage member, said Y-direction moving coils receiving magnetic flux from said Y-direction magnetic flux generators so as to generate a driving force in a specific Y-direction parallel with said reference plane between said Y-direction magnetic flux generators and said Y-direction moving coils,
    a plurality of X-direction magnetic flux generators secured to one of said stationary support plate and said stage member; and
    a plurality of X-direction moving coils secured to the other of said stationary support plate and said stage member, said X-direction moving coils receiving magnetic flux from said X-direction magnetic flux generators so as to generate a driving force in said X-direction between said X-direction magnetic flux generators and said X-direction moving coils;
    wherein at least one of said Y-direction moving coils and at least one of said Y-direction magnetic flux generators at least partly overlap each other in an X-direction, which is parallel with said reference plane and perpendicular to said Y-direction, and do not overlap in said Y-direction, and
    wherein at least one of said X-direction moving coils and at least one of said X-direction magnetic flux generators at least partly overlap each other in said X-direction, and do not overlap in said Y-direction.

2. The stage apparatus according to claim 1, wherein said at least one of said Y-direction moving coils and said at least one of said Y-direction magnetic flux generators, which are secured to said stage member, are aligned in said X-direction.

3. The stage apparatus according to claim 1, further comprising a pair of Y-direction displacement detection sensors provided in the vicinity of opposite ends of said at least one of said Y-direction moving coils and said at least one of said Y-direction magnetic flux generators which are secured to said stage member, for detecting displacement thereof in said Y-direction.

4. The stage apparatus according to claim 3, wherein all of said Y-direction moving coils that are secured to said stage member are arranged between said pair of Y-direction displacement detection sensors.

5. The stage apparatus according to claim 1, wherein said stage apparatus comprises an image movement correction apparatus.

6. The stage apparatus according to claim 5,
    wherein said image movement correction apparatus comprises an image pickup apparatus having a square shape defined by a pair of X-direction sides extending in the X-direction and a pair of Y-direction sides extending in the Y-direction,
    wherein at least one of said Y-direction magnetic flux generators and at least one of said Y-direction moving coils, which are secured to said stage member, are secured thereto along said X-direction sides, and
    wherein at least one of said X-direction magnetic flux generators and at least one of said X-direction moving coils, which are secured to the stage member, are secured thereto along said Y-direction sides.

7. The stage apparatus according to claim 5, wherein said image movement correction apparatus comprises a correction lens.

8. The stage apparatus according to claim 1, wherein said X-direction moving coils and said Y-direction moving coils each comprises a planar coil parallel with said reference plane.

9. The stage apparatus according to claim 1, wherein said X-direction magnetic flux generators and said Y-direction magnetic flux generators each comprises:
    a magnet; and
    a yoke through which magnetic flux of said magnet is transmitted and which generates magnetic lines of flux together with said magnet.

10. An image movement correction apparatus for a camera using the stage apparatus according to claim 5, wherein said camera comprises:
    said stage apparatus;
    a rotational shake detection sensor for detecting rotational shake of said camera in said reference plane; and
    a controller for supplying electricity to said Y-direction moving coils to correct the camera shake in accordance with shake information detected by the rotation-shake detection sensor.

11. An image movement correction apparatus for a camera using the stage apparatus according to claim 6, wherein said camera comprises:
    said stage apparatus;

a rotational shake detection sensor for detecting rotational shake of said camera in said reference plane; and a controller for supplying electricity to said Y-direction moving coils to correct the camera shake in accordance with shake information detected by the rotation-shake detection sensor.

12. The image movement correction apparatus for a camera using the stage apparatus, according to claim 10, comprising:

X-direction and Y-direction shake detection sensors for detecting camera shake in said X-direction and said Y-direction, respectively, wherein said controller supplies electricity to said X-direction moving coils and said Y-direction moving coils to correct said camera shake in accordance with shake information detected by said X-direction shake detection sensor and said Y-direction shake detection sensor, respectively.

13. The image movement correction apparatus for a camera using the stage apparatus, according to claim 11, comprising:

X-direction and Y-direction shake detection sensors for detecting camera shake in said X-direction and said Y-direction, respectively, wherein said controller supplies electricity to said X-direction moving coils and said Y-direction moving coils to correct said camera shake in accordance with shake information detected by said X-direction shake detection sensor and said Y-direction shake detection sensor, respectively.

14. The stage apparatus according to claim 1, wherein a distance between one pair of Y-direction moving coils is shorter than a distance between one pair of X-direction moving coils.

* * * * *